United States Patent
Cho et al.

(10) Patent No.: US 9,858,960 B2
(45) Date of Patent: Jan. 2, 2018

(54) METHOD AND APPARATUS FOR CONVERTING AND REPRODUCING CONTENTS IN STORAGE MEDIUM

(71) Applicant: LG ELECTRONICS INC., Seoul (KR)

(72) Inventors: Sunghyun Cho, Seoul (KR); Hyunkook Khang, Seoul (KR); Joonhee Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/121,211

(22) PCT Filed: Jan. 8, 2015

(86) PCT No.: PCT/KR2015/000198
§ 371 (c)(1),
(2) Date: Aug. 24, 2016

(87) PCT Pub. No.: WO2015/126057
PCT Pub. Date: Aug. 27, 2015

(65) Prior Publication Data
US 2017/0011768 A1    Jan. 12, 2017

Related U.S. Application Data

(60) Provisional application No. 61/944,040, filed on Feb. 24, 2014, provisional application No. 61/980,530, (Continued)

(51) Int. Cl.
*H04N 5/765*    (2006.01)
*H04N 9/80*    (2006.01)
*G11B 20/00*    (2006.01)

(52) U.S. Cl.
CPC .... *G11B 20/00224* (2013.01); *G11B 20/0021* (2013.01); *G11B 20/00086* (2013.01); *G11B 20/00217* (2013.01)

(58) Field of Classification Search
CPC .......... G11B 20/0021; G11B 20/00217; G11B 20/00224; G11B 20/00086
(Continued)

(56) References Cited

U.S. PATENT DOCUMENTS 8,140,675 B2 * 3/2012 Yokota ............. G11B 20/00086
380/258
2008/0091615 A1 * 4/2008 Choi .................. G06Q 20/3829
705/71
(Continued)

FOREIGN PATENT DOCUMENTS

KR    10-2007-0005893 A    1/2007
KR    10-2009-0056647 A    6/2009
(Continued)

*Primary Examiner* — Robert Chevalier
(74) *Attorney, Agent, or Firm* — Birch, Stewart, Kolasch & Birch, LLP

(57) ABSTRACT

Provided is a method of playing content stored in a storage device including requesting a conversion of the content to a content service server, receiving content key information and additional information for the conversion of the content from the content service server, and performing the conversion of the content based on the content key information and the additional information.

16 Claims, 26 Drawing Sheets

Related U.S. Application Data filed on Apr. 16, 2014, provisional application No. 61/986,078, filed on Apr. 29, 2014, provisional application No. 62/021,001, filed on Jul. 3, 2014.

(58) Field of Classification Search
USPC .............................. 386/232, 239, 248, 323
See application file for complete search history.

(56) References Cited

U.S. PATENT DOCUMENTS

| | | |
|---|---|---|
| 2008/0134345 A1 | 6/2008 | Epstein |
| 2010/0257569 A1 | 10/2010 | O'Hanlon |
| 2010/0313226 A1 | 12/2010 | Cholas et al. |

FOREIGN PATENT DOCUMENTS

| | | | |
|---|---|---|---|
| KR | 10-2010-0051723 A | 5/2010 | |
| KR | 10-2010-0067798 A | 6/2010 | |

\* cited by examiner

FIG. 25

| LEVEL | CONTENT LEVEL (2510) | VIDEO PROFILE (2511) (CODEC, PROFILE, RESOLUTION) | AUDIO PROFILE (2513) | DEVICE LEVEL (2520) |
|---|---|---|---|---|
| 1 | SD | H.264, FIRST PROFILE, 480 | FIRST PROFILE | CONTENT PLAYBACK FUNCTION (level 1) COPY/MOVE/DELETE FUNCTION (level 1) |
| 2 | HD | H.264, SECOND PROFILE, 1080 | SECOND PROFILE | CONTENT PLAYBACK FUNCTION (level 1,2) COPY/MOVE/DELETE FUNCTION (level 1,2) |
| 3 | UHD | H.265, THIRD PROFILE, 1440 | THIRD PROFILE | CONTENT PLAYBACK FUNCTION (level 1,2,3) COPY/MOVE/DELETE FUNCTION (level 1,2,3) |

METHOD AND APPARATUS FOR CONVERTING AND REPRODUCING CONTENTS IN STORAGE MEDIUM

CROSS REFERENCE TO RELATED APPLICATIONS

This application is the National Phase of PCT International Application No. PCT/KR2015/000198, filed on Jan. 8, 2015, which claims priority under 35 U.S.C. 119(e) to U.S. Provisional Application No. 61/944,040, filed on Feb. 24, 2014, 61/980,530, filed on Apr. 16, 2014, 61/986,078, filed on Apr. 29, 2014 and 62/021,001, filed on Jul. 3, 2014, all of which are hereby expressly incorporated by reference into the present application.

TECHNICAL FIELD

The present invention relates to a method and apparatus for converting content stored in a storage medium and playing the converted content and, more particularly, to a technique of repackaging high definition (HD) content of a Blu-ray disc (BD) to use the content and a technique of implementing a function of a BD player supporting a secure content storage association (SCSA) player function.

BACKGROUND ART

Recently, as smartphones and smart TVs have adopted an ultra-high definition (UHD) technology beyond full HD, various types of full HD or UHD content are anticipated to be encountered in various fields such as movie, concerts, and sports, as well as air channel broadcasting in the future.

However, if existing playback devices are not able to play various types of full HD and UHD content, users cannot use such content. Thus, playback devices are required to play full HD and UHD content, and a scheme enabling even an existing playback device to play such content may be required.

Also, a related art device using content, employing a technique of sharing AV content between certified devices, uses, shares, and exchanges content without separate restrictions or technical conditions regarding a memory medium.

Here, however, separate requirements for a storage are not required to share and play content between a content storage and a content device. As a result, a service such as playing or copying is used by using content stored in a general storage. Only a session connection service for exchanging content with a license server is required and a separate certified storage device is not prepared.

DISCLOSURE

Technical Problem

An aspect of the present disclosure is to propose a method for defining a function of a next-generation BD player, and storing digital content created by a BD in a flash memory and playing the digital content.

Another aspect of the present disclosure is to provide a compatibility function for storing digital content created by a BD in a desired codec, and define export data.

Another aspect of the present disclosure is to provide a compatibility function for converting digital content created by a BD into a desired video enhancement form and storing the same in a memory.

Another aspect of the present disclosure is to provide a method for playing digital content created by a BD in a BD player having a secure content storage association (SCSA) player function.

Another aspect of the present disclosure is to define a system architecture including a configuration of a device capable of playing secure high definition content, a configuration of a network, and a transmission protocol between a server and a device.

Another aspect of the present disclosure is to provide a method and system for obtaining and managing license information for playing secure high definition content.

Another aspect of the present disclosure is to define a session for transmitting information between devices in a system for playing secure high definition content.

Technical Solution

According to an aspect of the present invention, a method for defining a function of a next-generation BD player and playing digital content created by a BD is provided.

According to another aspect of the present invention, a compatibility function for storing digital content created by a BD in a desired codec is provided, and export data is defined.

According to another aspect of the present invention, a method for converting digital content created by a BD into a desired video enhancement form is provided.

According to another aspect of the present invention, a method for playing digital content created by a BD in a BD player having a secure content storage association (SCSA) player function is provided.

According to another aspect of the present invention, a system architecture including a configuration of a device capable of playing SCSA content, a configuration of a network, and a transmission protocol between a server and a device is defined.

According to another aspect of the present invention, a method and system for obtaining and managing license information for playing secure high definition content are provided.

Advantageous Effects

By defining technologies regarding high definition content, content may be converted by an existing BD to obtain digital content, and the digital content may be immediately played. Through this, the corresponding high definition content may be stored in a memory other than the BD and played. Using the conversion technology, more stable and comprehensive content distribution market may be anticipated.

Also, a player, a storage, and content satisfying security for distributing high definition content may be effectively searched to allow a user to play, copy, and move purchased content more conveniently.

Also, even though a user device is connected to a storage device storing content of a format or a profile not supported by the user device, a user may automatically search and/or download a substitute content file playable in the user device through the Internet or convert the same into playable content, thereby playing high definition or ultra-high definition content. Accordingly, in a case in which the user device cannot play content stored in the storage device, the user may not need to perform a cumbersome procedure such as directly accessing a download server to search for content or selecting searched content and downloading the same.

Also, even though a playback device has poor performance, the playback device may search for substitutive content and play the same, and thus, a user may be provided with various content services.

Also, by providing a directory structure and a file format of high definition content, secure high definition content data may be more effectively managed and played.

Also, since license information of high definition content is obtained from a license server, a function may be added to an existing certified device without separately undergoing certification and high definition content may be used through cooperative operation of the added function.

DESCRIPTION OF DRAWINGS

FIG. 25 is a view illustrating a level of high definition content and a level of a playback device playing the high definition content, according to an embodiment to which the present invention is applied.

BEST MODES

Figure 1:
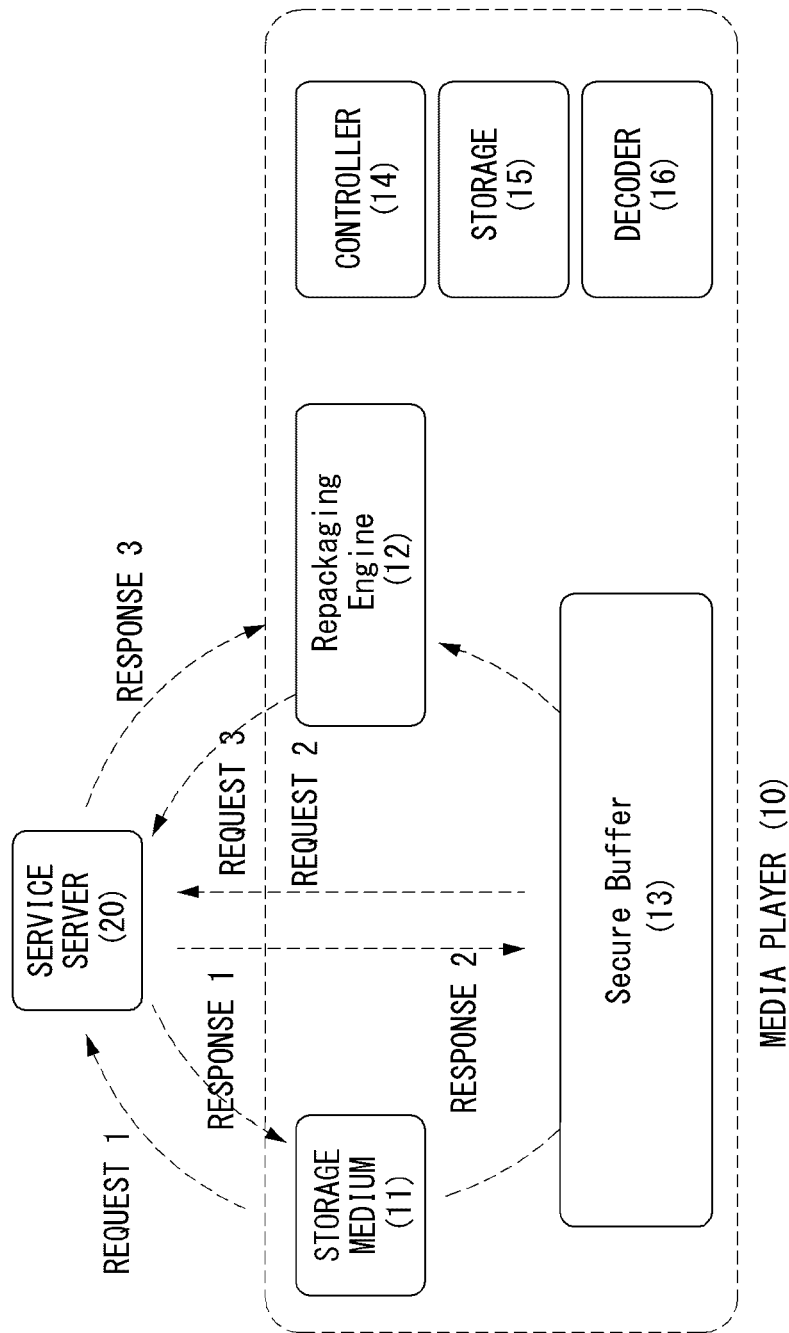
FIG. 1 is a view illustrating a service structure for digital-repackaging content of a storage medium and playing the same, according to an embodiment to which the present invention is applied.

The present invention provides a method of playing content stored in a storage device including: requesting a conversion of the content from a content service server; receiving content key information and additional information for the conversion of the content from the content service server; and performing the conversion on the content based on the content key information and the additional information.

In the present invention, the content key information may be received when it is confirmed by the content service server that at least one of a content player and the storage device supports a digital bridge function, and wherein the digital bridge function represents that the content is converted to a different type of content.

In the present invention, the content key information may indicate certificate information which is required for using the content stored in the storage device.

In the present invention, the additional information may include at least one of subtitle content, audio content and metadata.

In the present invention, the additional information may be multiplexed to a single consecutive bitstream.

In the present invention, the content may indicate BD (Blu-ray Disc) content, and the BD content is converted to SCSA (Secure Content Storage Association) content.

In the present invention, the method may further include: checking whether it is possible to play the SCSA content; receiving license information from a license server when it is not possible to play the SCSA content, as a result of the checking; and playing the SCSA content based on the license information.

In the present invention, the license information may include at least one of license file information and license key information.

The present invention also provides an apparatus of playing a content stored in a storage device including: a controller configured to request a conversion of the content to a content service server, and receive content key information and additional information for the conversion of the content from the content service server; and a repackaging engine configured to perform the conversion of the content based on the content key information and the additional information.

In the present invention, the apparatus may further include: an export buffer configured to multiplex the additional information as a single consecutive bitstream.

In the present invention, the controller may be further configured to check whether it is possible to play the SCSA content, and receive license information from a license server when it is not possible to play the SCSA content as a result of the checking, wherein the apparatus further includes: a decoder playing the SCSA content based on the license information.

MODE FOR INVENTION

Hereinafter, elements and actions of embodiments of the present invention will be described below in more detail with reference to the accompanying drawings.

However, the elements and actions illustrated in the drawings and described with reference thereto are set forth only as examples and do not limit the spirit of the invention or its key elements and actions.

The terms used in this specification were selected to include current, widely-used, general terms. However, in certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

FIG. 1 is a view illustrating a service structure for digital-repackaging content of a storage medium and playing the same, according to an embodiment to which the present invention is applied.

The service structure for digital-repackaging content stored in a storage medium and playing the same may include a media player 10 and a service server 20.

The media player 10 may retrieve content stored in the storage medium 11 and play the content through a decoder. The media player 10 may be provided with a content-related service through communication with the service server 20.

The media player 10 may include the storage medium 11, a repackaging engine 12, a secure buffer 13, a controller 14, a storage 15, and a decoder 16. Here, the storage medium 11 may refer to a Blu-ray disc (BD), a digital versatile disc (DVD), or a secure content storage association (SCSA) memory, and the media player 10 may include a decoder for playing the storage medium 11.

The repackaging engine 12 may repackage content received from the storage medium 11 in order to play the content in a different media player or copy or move the content to a different device. For example, in a case in which content stored in the storage medium 11 is BD content, the repackaging engine 12 may repackage the BD content to digital content to play the BD content in an SCSA player.

The secure buffer 13 may store secure information of the media player 10. For example, the secure buffer 13 may request key information for repackaging from the service server 20, and may receive the key information from the service server 20 and store the same.

The controller 14 may control every operation performed in the media player 10.

The storage 15 may store content, additional information, and other data. For example, the storage 15 may store repackaged digital content and additional content information downloaded from the outside. However, the storage 15 is not an essential component of the media player 14 and may be included in other component.

The decoder 16 may play content stored in the storage medium 11. Also, the decoder 16 may include a plurality of decoders. For example, the decoder 16 may include a BD decoder for playing BD content and another decoder for playing repackaged digital content.

Hereinafter, in the present disclosure, a case in which BD content is converted into digital content will be described as an example, but the present invention is not limited thereto. For example, content conversion may be selectively performed among various types of content.

Referring to FIG. 1, the media player 10 may request digital bridge or digital copy from the service server 20 (request 1). Here, digital bridge may refer to conversion of any one type of content into a different type of content. For example, in a case in which the media player 10 is a BD player, the media player 10 may request the service server 20 to convert BD content stored in the storage medium 11.

Upon receiving the request 1, the service server 20 may verify validity of at least one of the media player 10 and the storage medium 11 (response 1). For example, the service server 20 may determine whether at least one of the media player 10 and the storage medium 11 is able to perform the digital bridge or digital copy function.

When it is determined that at least one of the media player 10 and the storage medium 11 is valid according to the validity verification result, the media player 10 may request secure information for performing the digital bridge function from the service server 20 (request 2).

According to the request 2, the media player 10 may receive content key information from the service server 20 (response 2). Here, the content key information may refer to certification information required for utilizing content stored in the storage medium 11.

The media player 10 may request repackaging information required for repackaging content stored in the storage medium 11 from the service server 20 (request 3). According to the request 3, the media player 10 may receive repackaging information from the service server 20 (response 3).

The media player 10 may perform repackaging on the content on the basis of the repackaging information. Here, the repackaging may be performed by the repackaging engine 12. Here, the repackaging information may refer to information required for converting a type of content into a different type of digital content. For example, the repackaging information may include at least one of video repackaging information required for converting video content stored in a storage medium into a different type of digital video content, audio repackaging information required for converting audio content into a different type of digital audio content, subtitle repackaging information required for converting subtitle content into a different type of digital subtitle content, and output data control information. Here, the output data control information may include meta data for controlling output data.

Figure 2:
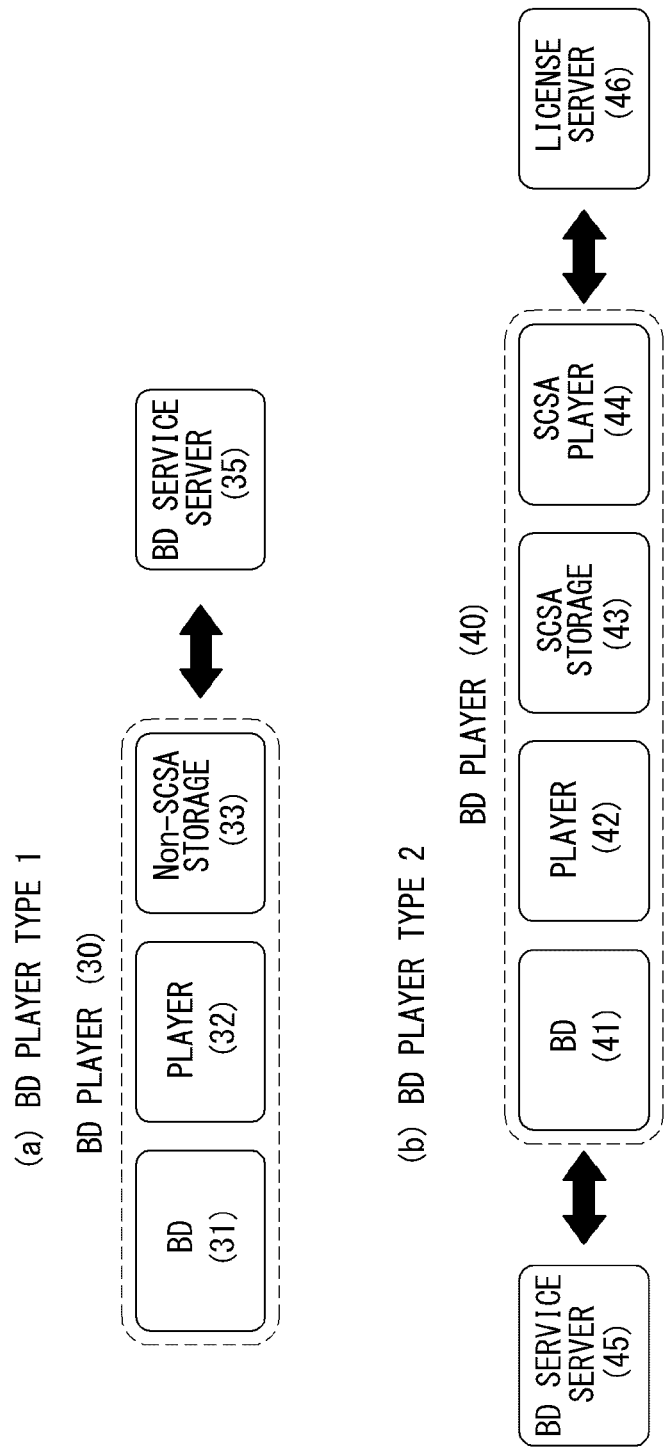
FIG. 2(a) is a view illustrating a BD player type including a general memory.
FIG. 2(b) is a view illustrating a BD player type including an SCSA memory and an SCSA player, according to an embodiment to which the present invention is applied.

FIG. 2(a) is a view illustrating a BD player type including a general memory, and FIG. 2(b) is a view illustrating a BD player type including an SCSA memory and an SCSA player, according to an embodiment to which the present invention is applied.

Before describing types of BD players, service structures for playing a BD player and an SCSA player will be described first.

A service structure for playing a BD player may include a BD player and a BD service server.

The BD player may include a BD and a player. The BD player may retrieve content information stored in the BD and play it through the player. The BD player may receive a BD-related service through communication with the BD service server.

Meanwhile, a service structure for playing the SCSA player may include an SCSA player and a license server.

The SCSA player may include an SCSA storage device and a player. The SCSA player may retrieve content information stored in the SCSA storage device and play it through the player. Here, the SCSA player may play the content information stored in the SCSA storage device by receiving valid license information from the license server.

The SCSA player may update license information for playing content through the license server. If the SCSA player does not have valid license information, the SCSA player is required to receive new license information from the license server.

The SCSA player may receive license information from the license server through transaction information of the SCSA player. When the SCSA player transmits the transaction information to the license server, the license server verifies validity of the transaction information and transmits the license information to the SCSA player.

FIG. 2(a) illustrates a BD player type 1 which represents a BD player 30 including a BD 1, a player 32, and a non-SCSA storage 33. Here, the non-SCSA storage 33 is a storage, rather than an SCSA storage able to store secure high definition content. For example, the non-SCSA storage 33 may refer to a general memory device.

The BD player 30 may convert content stored in the BD into digital content and store the converted digital content in the non-SCSA storage 33. Also, the BD player 30 may move or copy the converted digital content to a different mobile device, a media player, and NAS equipment. Meta data, audio data, or a subtitle required for playing the content may be downloaded from a BD service server 35 or obtained from the BD 31.

FIG. 2(b) illustrates a BD player type 2 which represents a BD player 40 including a BD 41, a player 42, an SCSA storage 43, and an SCSA player 44. The SCSA storage 43 is an SCSA storage able to store secure high definition content (for example, SCSA content), and the SCSA player 44 is a player able to play the secure high definition content.

The BD player 40 may download content information required for playing content within the BD 41 or content within the SCSA storage 43 from a BD service server 45. In order to play the SCSA content within the SCSA storage 43, the BD player 40 is required to receive valid license information from the license server 46.

Meanwhile, in order to use content within the BD 41 in a different player or a different device, the BD player 40 is required to repackage the content to digital content. For example, in order to store the content in the SCSA storage 43, in order to play the content through the SCSA player 44, or in order to copy or move the content to an external different device, the BD player 40 may repackage the content within the BD 41 to digital content.

A specific embodiment thereof will be described hereinafter with reference to relevant drawings.

Figure 3:
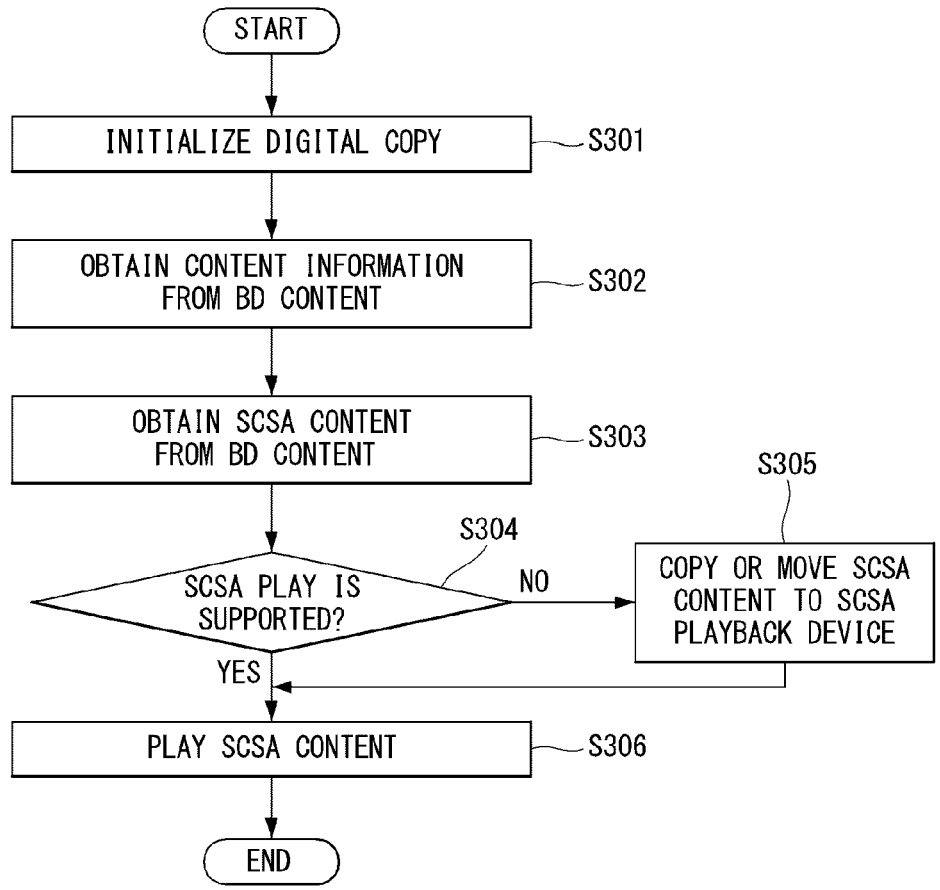
FIGS. 3 and 4 are flow charts illustrating a process of obtaining SCSA content according to a BD player type and playing the same, according to embodiments to which the present invention is applied.
Figure 4:
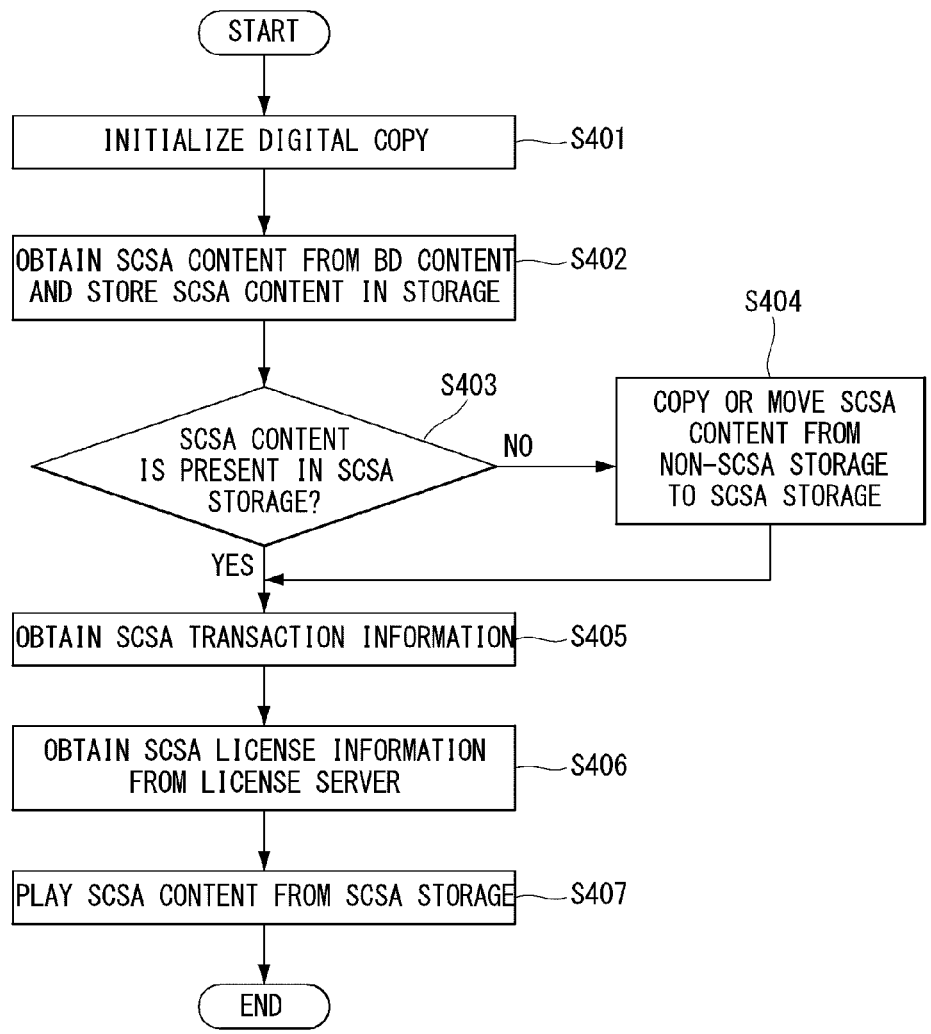

FIGS. 3 and 4 are flow charts illustrating a process of obtaining SCSA content according to a BD player type and playing the same, according to embodiments to which the present invention is applied.

The present invention provides a method for obtaining SCSA content from a BD content within a BD and playing the same. Here, the SCSA content may refer to encrypted content which is stored in a specific memory and available to be moved to a different device. Digital copy or digital bridge of the BD content may be used to obtain SCSA content. In this disclosure, digital copy, digital bridge, repackaging, and content conversion may be used as having a similar meaning, and may be appropriately construed in a corresponding part.

Referring to FIG. 3, first, the BD player may perform initialization process for digital copy (S301). After the initialization, the BD player may obtain content information from the BD content (S302). The BD player may obtain SCSA content from the BD content on the basis of the content information (S303).

It may be determined whether the BD player supports playing of the SCSA content (S304).

In a case in which the BD player supports playing of the SCSA content according to the determination result, the BD player may play the SCSA content (S306). For example, the BD player may include an SCSA player therein or may include an application for playing the SCSA content.

If, however, the BD player does not support playing of the SCSA content, the SCSA content may be coped or moved to a device able to play the SCSA content (S307).

Referring to FIG. 4, first, the BD player may perform an initialization process for digital copy (S401). After the initialization, the BD player may obtain SCSA content from the BD content and store the obtained SCSA content in a storage. Here, the storage may be a non-SCSA storage or an SCSA storage.

The BD player may determine whether the SCSA content is stored in the SCSA storage (S403).

In a case in which the SCSA content is not stored in the SCSA storage, the BD player may obtain SCSA transaction information from the SCSA storage (S405). Also, in order to play the SCSA content, the BD player may obtain SCSA license information from a license server (S406). Here, the SCSA license information may include a license file and a license key. The license file may be stored in a general file system of the SCSA storage, and the license key may be stored in a secure region of the SCSA storage.

The BD player may play the SCSA content on the basis of the SCSA license information (S407). Here, whether the SCSA content is to be played may be determined on the basis of a level of the SCSA content and a level of the BD player. Details thereof will be described in another embodiment hereinafter.

Meanwhile, in a case in which the SCSA content is not stored in the SCSA storage, the SCSA content may be copied or moved from a non-SCSA storage to the SCSA storage (S404). After the SCSA content is copied or moved to the SCSA storage, steps S405 to S407 may be performed.

Figure 5:
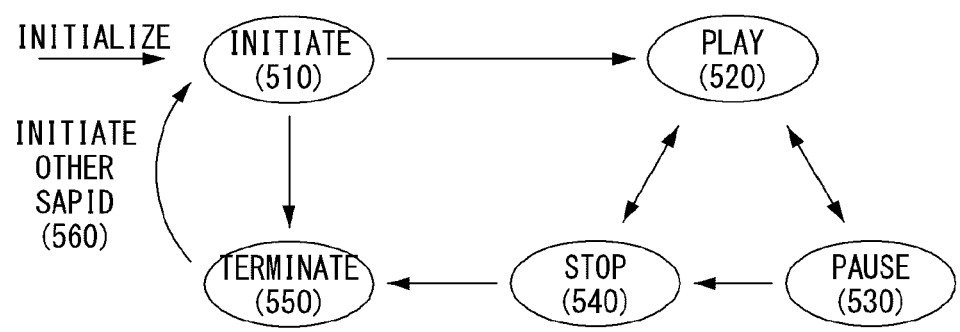
FIG. 5 is a diagram of a playback state of SCSA content, according to an embodiment to which the present invention is applied.

FIG. 5 is a diagram of a playback state of SCSA content, according to an embodiment to which the present invention is applied.

First, in an opening step (510) as an initialization process of playing SCSA content, a license file, a license key, and transaction information may be searched. License information may be obtained from a license server or already obtained license information may be checked.

When license information and transaction information are checked in the opening step (510), the SCSA content may be played (520). Here, playing may include streaming.

Here, the transaction information may include bundle information that can be configured according to various restrictions. For example, the restrictions may include a content level, a play level, and a usage level. The content level may include SD content, HD content, xHD content, and QHD content, the play level may include playing and streaming, and the usage level may include moving, copying, and storing.

In a specific example, a first bundle may refer to a package allowing for performing playing and streaming and performing moving, copying, and storing with respect to every content level. A second bundle may refer to a package allowing for only a streaming service with respect to SD content and not permitting moving, copy, and storing.

Meanwhile, whether the SCSA content is to be played may be determined according to a player level. For example, in a case in which a level of the BD player is higher than or equal to the content level, the SCSA content may be played, but otherwise, the SCSA content may not be played. When it is impossible to play the SCSA content, a play state of the SCSA content is switched to a closed state (550).

Also, the played SCSA content may be paused (530) or stopped (540) by control information.

Figure 6:
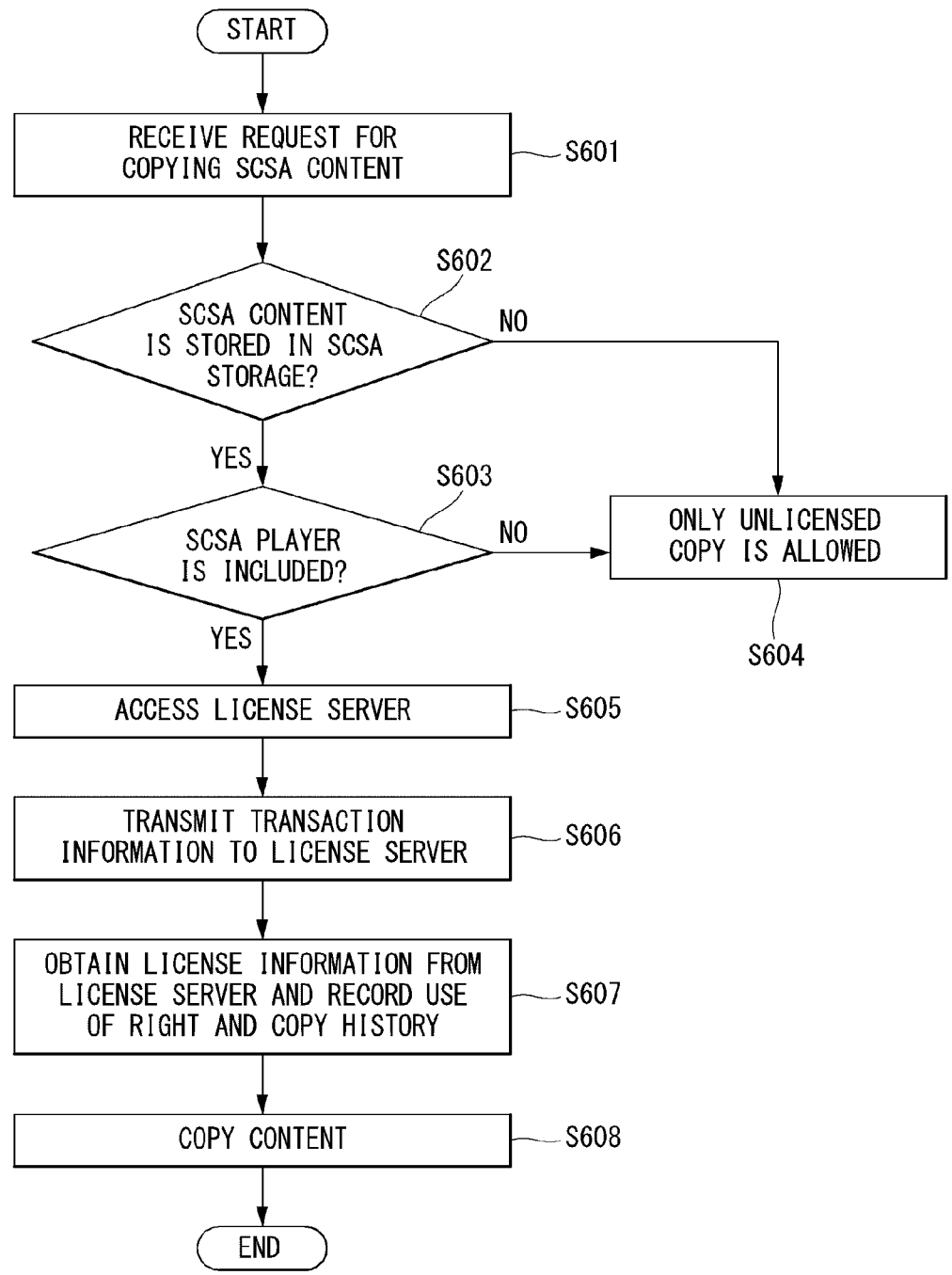
FIGS. 6 and 7 are flow charts illustrating a process of copying SCSA content, according to embodiments to which the present invention is applied.
Figure 7:
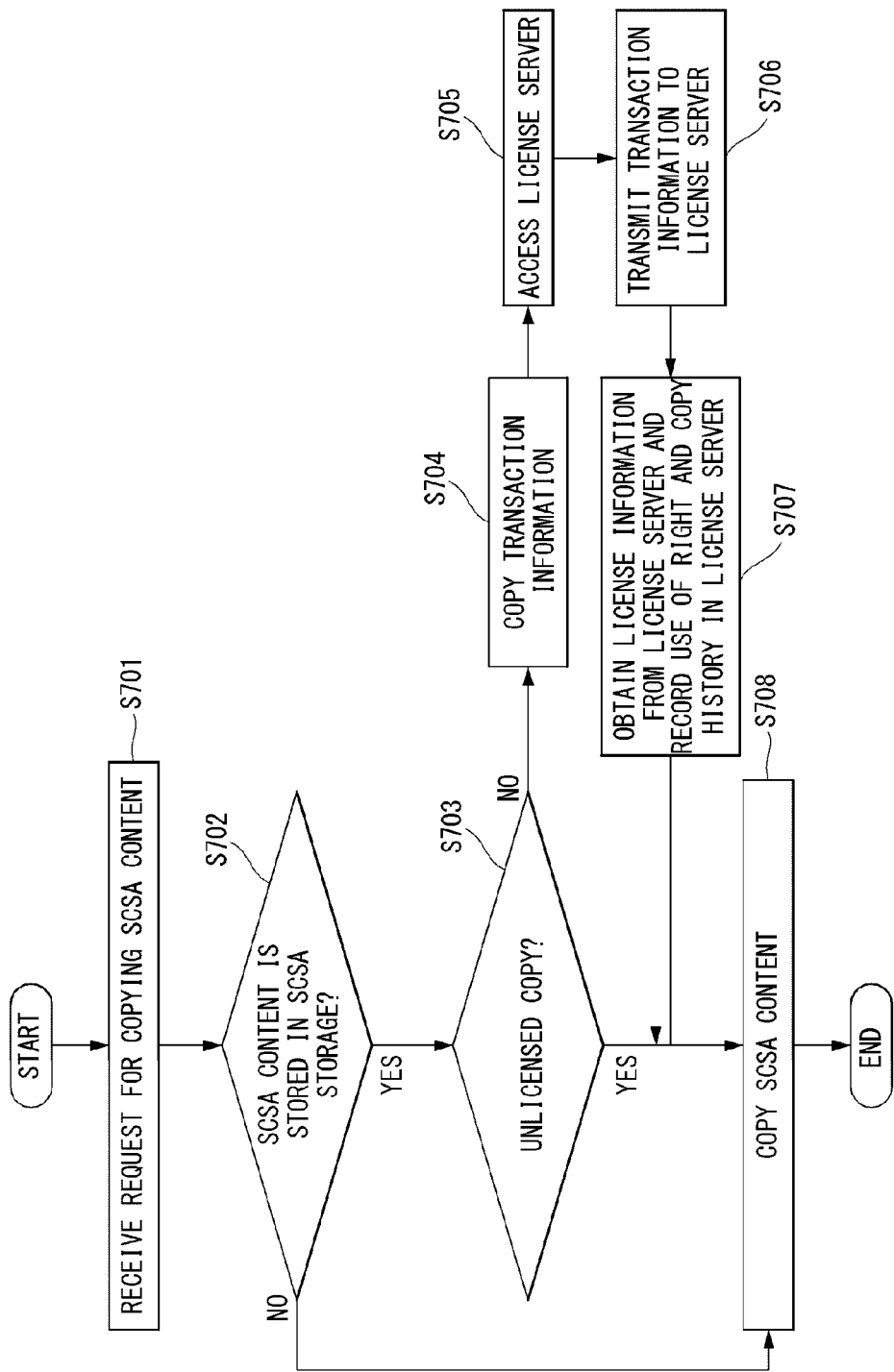

FIGS. 6 and 7 are flow charts illustrating a process of copying SCSA content, according to embodiments to which the present invention is applied.

First, referring to FIG. 6, the BD player may receive request for digital copy of the SCSA content from a user (S601).

When the request for digital copy is received, the BD player may determine whether the SCSA content is stored in the SCSA storage (S602).

In a case in which the SCSA content is stored in the SCSA storage according to the determination result, it may be determined whether the BD player includes an SCSA player (S603). In a case in which the SCSA content is not stored in the SCSA storage according to the determination result, the BD player may perform only unlicensed copy on the SCSA content (S604).

In a case in which the BD player includes an SCSA player, the BD player may access a license server in order to be certified for copying the SCSA content (S605). The BD player may then transmit transaction information to the license server (S606). If, however, the BD player does not include the SCSA player, the BD player may perform only unlicensed copy on the SCSA content (S604).

The BD player may obtain license information from the license server, and record the use of right and copy history in the license server (S607).

After performing the aforementioned process, the BD player may copy the SCSA content to a different device (S608).

In another embodiment to which the present invention is applied, referring to FIG. 7, first, the BD player may receive a request for digital copy of the SCSA content from a user (S701).

When the request for digital copy is received, the ED player may determine whether the SCSA content is stored in the SCSA storage (S702).

In a case in which the SCSA content is stored in the SCSA storage according to the determination result, the ED player may determine whether right of the SCSA content represents unlicensed copy (S703).

In a case in which right of the SCSA content represents unlicensed copy, the BD player may perform unlicensed copy on the SCSA content (S708).

If, however, right of the SCSA content does not represent unlicensed copy, the BD player may cope transaction information (S704), access the license server (S705), and transmit the transaction information (S706).

The BD player may obtain license information from the license server and records the use of right and copy history in the license server (S707).

After performing the aforementioned process, the BD player may cope the SCSA content to a different device (S708).

Figure 8:
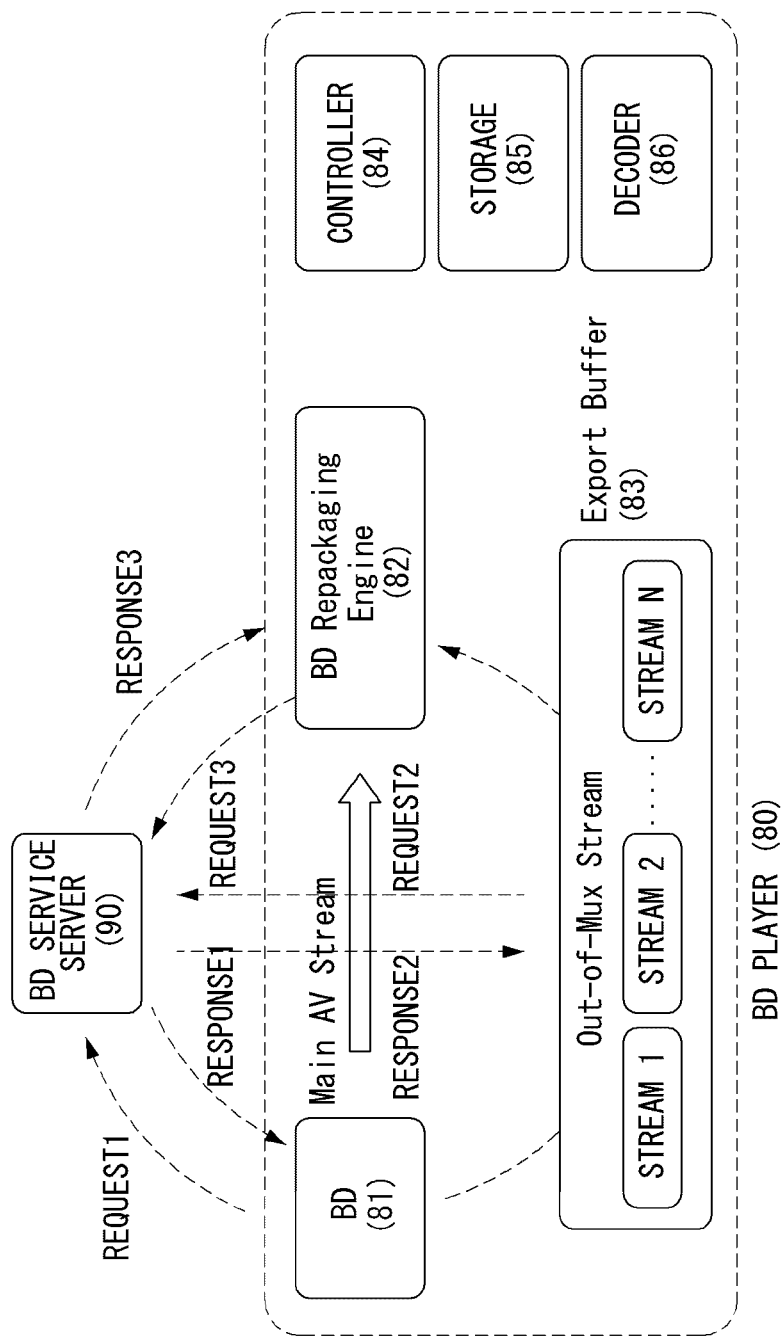
FIG. 8 is a view illustrating a service structure for converting content of a BD into digital content and playing the same, according to an embodiment to which the present invention is applied.

FIG. 8 is a view illustrating a service structure for converting content of a BD into digital content and playing the same, according to an embodiment to which the present invention is applied.

A service structure for digital-repackaging content stored in the BD to play the same may include a BD player 80 and a BD service server 90.

The BD player 80 may retrieve content stored in a BD 81 and play the content through a decoder. Also, the BD player 80 may be provided with a content-related service through communication with the BD service server 90.

The BD player 80 may include a BD 81, a BD repackaging engine 82, an export buffer 83, a controller 84, a storage 85, and a decoder 86.

The BD repackaging engine 82 may repackage the BD content received from the BD 81 to SCSA content in order to play the content in an SCSA player.

The export buffer 83 may multiplex at least one auxiliary content provided by a content provider and store the same. For example, in case of high definition video supporting a text-based subtitle, the subtitle may be stored in the export buffer 83 to provide a service. In this case, since the at least one auxiliary stream is separately stored, it does not affect main content provided from the BD 81. The at least one auxiliary extreme may be multiplexed so as to be provided as a continuous stream. Also, the at least one auxiliary stream may be provided from the BD service server 90 or from the BD 81.

The controller 84 may control every operation performed in the BD player 80.

The storage 85 may store content, additional information, and other data. For example, the storage 85 may store repackaged digital content and additional content information downloaded from the outside. However, the storage 15 may not be an essential component of the BD player 80 and may be included in other component.

The decoder 86 may play content stored in the BD 81. Also, the decoder 86 may include a plurality of decoders. For example, the decoder 86 may include a BD decoder for playing BD content and an SCSA decoder for playing repackaged SCSA content Referring to a content repackaging process illustrated in FIG. 8, the BD player 80 may request digital bridge or digital copy from the BD service server 90 (request 1). Here, digital bridge may refer to conversion of any one type of content into a different type of content.

When the request 1 is received, the BD service server 90 may verify validity of at least one of the BD player 80 and the BD 81 (response 1). For example, the BD service server

90 may determine whether at least one of the BD player 80 and the BD 81 is able to perform the digital bridge or digital copy function.

The present invention provides various embodiments regarding validity verification.

Validity verification regarding the BD 81 will be described in an embodiment, when the BD service server 90 receives the request 1 from the BD player 80, the BD service server 90 may check a profile level of the BD 81. When the profile level represents a specific value, it indicates that the BD 81 is able to perform the digital bridge function. Also, validity verification may also be performed by checking ROM information within the BD 81.

In another embodiment, the BD service server 90 may perform validity verification through an identifier of the BD 81. The identifier of the BD 81 may include version information or indicator information, and information for digital bridge or a separate syntax may be added.

In another embodiment, the BD service server 90 may perform validity verification by checking a data element list enabling the digital bridge function. For example, content supporting seamless multi-angle, multi-story, director's cuts, and trilogy collection may not be used as digital export as is, and thus, a data list of the corresponding content may be checked, and thereafter, validity verification may be performed.

In another embodiment, validity verification regarding the BD player will be described.

First, the BD service server 90 may check a player certificate or player license information within the BD player 80. When the player certificate or the player license information is confirmed, the BD player 80 may support the digital bridge function.

After the checking, the BD service server 90 may perform export filtering and determine validity of the player certificate or the player license information again. Thereafter, the BD service server 90 may perform an export process.

In another embodiment, validity verification of the BD player 80 may be performed by checking a level of the BD player 80. For example, when the BD player 80 is a 4K player, the BD player 80 may support the digital bridge function, and thus, validity thereof may be verified. Here, the BD player 80 should not be included in a revocation list.

In another embodiment, validity verification of the BD player 80 may be performed by checking ROM memory information of the BD player 80.

In another embodiment, the BD player 80 may request repackaging on content selected from a play list of the BD 81, and in response to the request, the BD service server 90 may perform validity verification on the BD 81 and the BD player 80. After the validity verification is performed, selection of content from the play list may be requested again.

In another embodiment, the BD player 80 may determine whether the BD player 80 is registered as a revoked device in the BD service server 90. On the premise that the BD player 80 is not registered as a revoked device in the BD service server 90, a certification procedure of the BD player 80 may be performed.

In another embodiment, a certification procedure regarding the BD player 80 may include a certification procedure regarding the BD 81 or may be performed as a separate process. That is, the BD player 80 may be certified, while the BD 81 may not be certified.

When it is determined that the BD player 80 is valid according to the validity verification result, the BD player 80 may request secure information for performing the digital bridge from the BD service server 90 (request 2).

According to the request 2, the BD player 80 may receive content key information from the BD service server (response 2). Here, the content key information may refer to certification information required for utilizing content stored in the BD 81.

The BD player 80 may request repackaging information required for repackaging content stored in the BD 81 from the BD service server 90 (request 3). According to the request 3, the BD player 80 may receive the repackaging information from the BD service server 90 (response 3)).

The BD player 80 may perform repackaging on the content on the basis of the repackaging information. Here, the repackaging may be performed by the BD repackaging engine 82.

In another embodiment, a state register of the BD player 80 may be defined. The state register may include primary audio, a title, a chapter, a play list, and a play item.

Meanwhile, the play list may include a main path and at least one sub-path. The play list may include at least one play item, and the play item may be classified as an item that may be used for digital copy or an otherwise item. For example, every play item may be defined to be used for digital copy or only a portion of play items may be defined to be used for digital copy. Of, none of play items may be defined to be used.

Also, one play item may include at least one sub-play item. For example, only one sub-play item corresponding to one sub-path may be present at a specific time.

In another embodiment, a user interface for utilizing BD content may be defined.

For example, when a specific UI button is clicked by a user, an additional UI button may be created or the user may shift to a next page. A UI button object may be executed by user activation or a system timer regardless of the use of the play list. Content object may be provided again even after playing is completed or stopped.

When the BD player 80 makes the request 1, the BD player 80 may provide a title, a play list, and a play item to the BD service server 90. After the BD service server 90 performs validity verification on the BD 81 and the BD player 80, sub-play items may be combined to form a single play item.

A plurality of play items may be seamlessly connected. Whether to seamlessly connect the plurality of play items may be determined through a digital bridge operation. The seamless connection may be adjusted upon selection from a digital bridge option or may be applied in the same manner as that of BD content. For example, when BD content is seamlessly connected, digital content repackaged through digital bridge may also be seamlessly connected. However, when BD content is not seamlessly connected, repackaged digital content may be seamlessly connected or may not.

Also, the seamless connection function may be used by defining meta data when content is converted into digital content. For example, a seamless connection flag may be defined or digital bridge meta data or a digital bridge flag for digital content conversion may be defined.

In another embodiment, a user interface (UI) for the digital bridge function may be defined. For example, a UI for the digital bridge function may be implemented using a Java UI associated with a BD play list.

Also, a separate application may be defined without using an existing BD Java. In this case, an application accessible to metadata within the BD 81 or meta data that can be received from the BD service server 90 is required to be defined. Here, the meta data may be AV data, or the like, required for digital bridge.

In another embodiment, a method for converting BD content into digital content is provided.

Network abstract layer (NAL) header data may be created from a start code prefix of BD content. Here, an NAL unit of the BD content may include a start code prefix.

In case of video format conversion, when BD content is converted into common file format (CFF), resolution can be converted. For example, resolution of 720×480(29.97i) may be converted into resolution of 640×480 or 854×480. Or, resolution of 720×576(25i) may be converted into 640×480 or 854×4801.

When the BD content is converted into a CFF, frame rate may also be converted. For example, in case of resolution of 1920×1080, a frame rate may be converted from 29.97i to 29.97p or from 25i to 30p.

Also, a maximum bit rate of BD content may also be converted. For example, in case of BD content of 40 Mbps, the BD content may be repackaged to 25 Mbps or 40 Mbps.

Also, in case of AVC convent, a parameter may be converted. For example, in case of AVC1, SPS/PPS conversion is prohibited, but parameter conversion is allowed for AVC3.

In another embodiment, BD bridge information may include every information for converting BD content into digital content. For example, the BD bridge information may include at least one of video bridge information required for converting BD video content into digital video content, audio bridge information required for converting BD audio content into digital audio content, subtitle bridge information required for converting BD subtitle content into digital subtitle content, and output data control information. Here, the output data control information may include meta data for controlling output data.

A system to which the present invention is applied may perform region control on repackaged digital content. For example, in a case in which region control is included in an existing BD title, repackaged digital content does not include information regarding region control. In this case, region control needs to be performed on the digital content.

In a first embodiment, whenever digital content is played, a license server may be accessed to perform region control. Here, the BD content includes the region control function.

In a second embodiment, a license for region control may be downloaded to digital content, and whenever the digital content is played, GPS information of a corresponding area may be checked, and thereafter, the digital content may be played. Here, the license for the region control may be played after a specific area information is checked.

In a third embodiment, the system to which the present invention is applied may check region control information when BD content is repackaged to digital content. For example, validity verification may be performed in a stage of certifying a BD service server by checking area information before the BD player converts BD content into digital content. Here, the area information may be checked by checking an IP address of the corresponding area or by receiving GPS information.

In a fourth embodiment, the system to which the present invention is applied may perform region control by checking region control information included in transaction information. That is, before license information received, region control may be performed by checking transaction information including region control information, parental control information, and output control information. For example, in a case in which region control information of the transaction information is problematic, content license cannot be permitted by the license server.

In a fifth embodiment, in a case in which a player commercially available in a specific area already includes region control information, when the corresponding player is licensed, region control may be performed.

Figure 9:
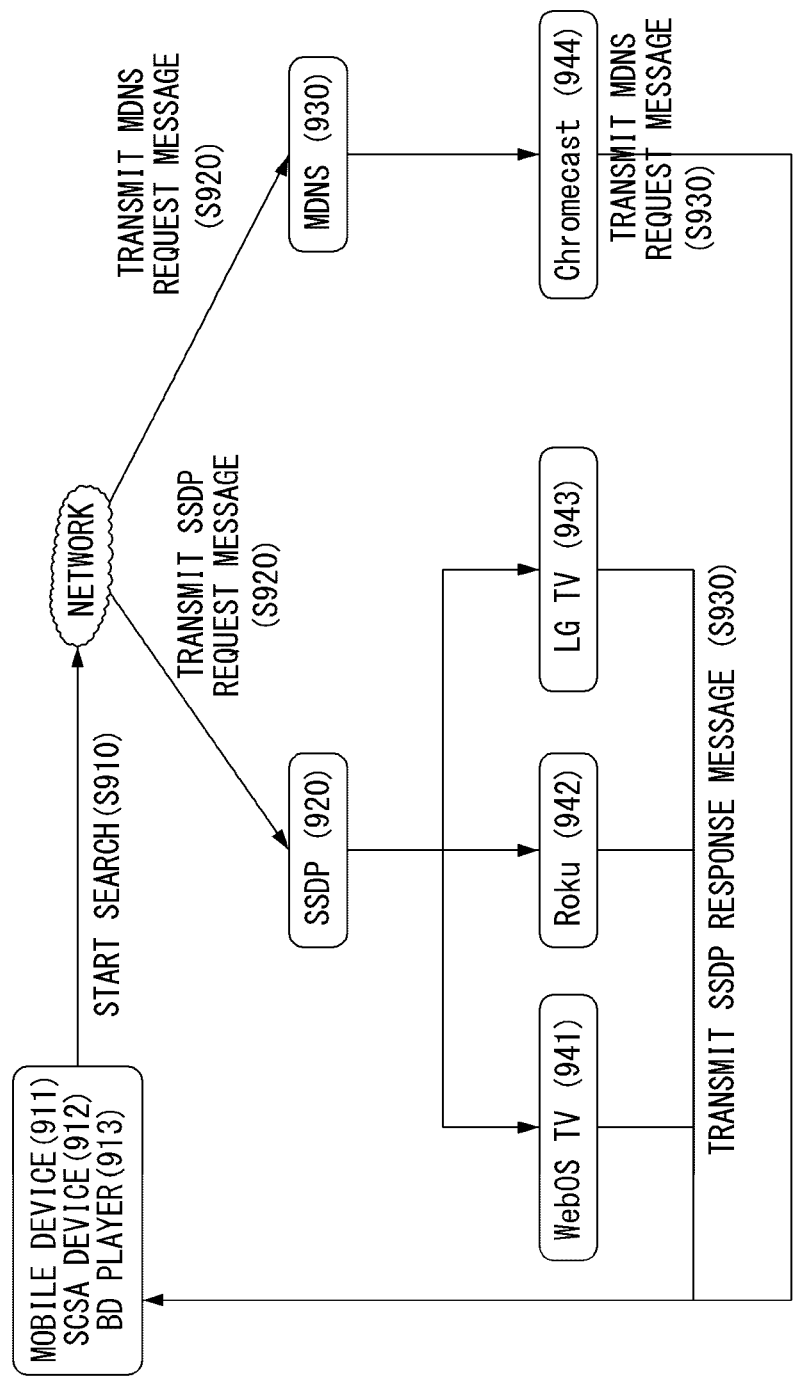
FIG. 9 is a flow chart illustrating a process of searching for a device, according to an embodiment to which the present invention is applied.

FIG. 9 is a flow chart illustrating a process of searching for a device, according to an embodiment to which the present invention is applied.

A mobile device 911, an SCSA device 912, or a BD player 913 may perform an export function and subsequently search for a device to which export output content is to be transmitted (S910). Here, a search target may be defined as a BD export device and the target device may be searched on a network. If the target device is restricted to an SCSA player, the BD player may search for the SCSA player. For example, the search target may be defined as "urn:SCSA App:service:SCSA-Level3-Player:1".

The devices may transmit a simple service discovery protocol (SSDP) request message to an SSDP 920 (S920) or transmit a multicast domain name system (mDNS) request message to an mDNS 930 (S920).

In case of a device having an SSDP server, devices connected thereto may be searched. For example, WebOS TV 941, Roku 942, or LG TV 943 may be discovered through the SSDP 920. Thus, the devices may receive an SSDP response message (S930).

In case of a device without the SSDP server, the server may have a different discovery protocol (mDNS) and transmit a corresponding appropriate request message to perform searching. For example, the device may discover chromecast 944 through the mDNS 930. Accordingly, the devices may receive an mDNS response message (S930).

In another example, in a case in which a PD SSDP server is provided, a DB player as a predefined search target is searched, and in a case in which the DB SSDP server is not provided, different protocols (UPnP, DLNA, and WebOS) may be searched.

In another example, in case in which an SCSA SSDP server is provided, an SCSA player as a predefined search target is searched, and in a case in which the SCSA SSDP server is not provided, the different protocols UPnP, DLNA, and WebOS) may be searched. Meanwhile, in a case in which a search target is stored in an SCSA storage, the SCSA device may load a search target value stored in the SCSA storage to perform searching.

In another embodiment, the BD player may check a position of BD content in a directory structure of a BD memory. Here, the position of the BD content may be defined as a URL. By transmitting the position of the BD content as URL, other devices may check the position of the BD content.

Figure 10:
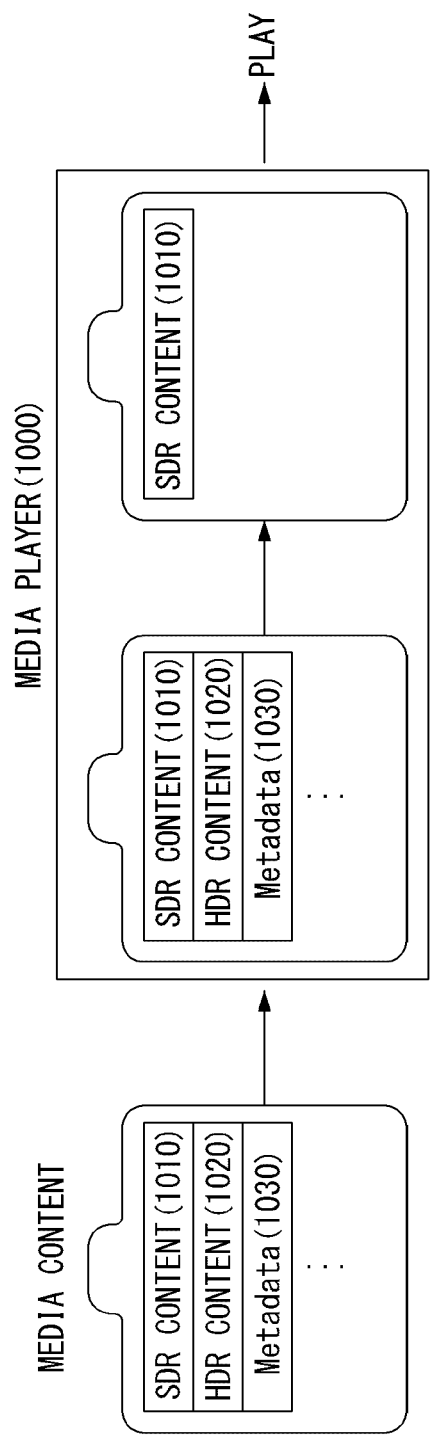
FIGS. 10 and 11 are views illustrating a process of separating multi-codec content for a media player to play the multi-codec content, according to embodiments to which the present invention is applied.
Figure 11:
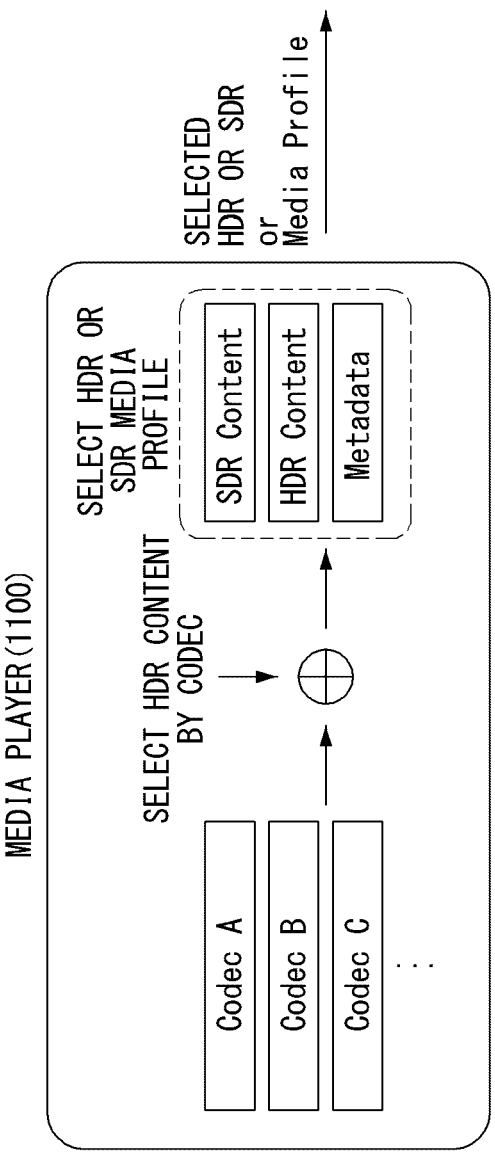

FIGS. 10 and 11 are views illustrating a process of separating multi-codec content for a media player to play the multi-codec content, according to embodiments to which the present invention is applied.

When media content including multi-codec content is received, a media player 1000 needs to play content appropriate for the media player 1000 or play only specific content selected by a user. Here, the media player 1000 may include a DVD player, a BD player, a set-top box (STB), and the media content may include at least one of standard dynamic range (SDR) content 1010, high dynamic range (HDR) content 1020, and meta data 1030. For example, the SDR content 1010 may refer to general content having peak luminance which is not high, and the HDR content 1020 may refer to content having high peak luminance.

Referring to FIG. 10, the media player 1000 may selectively separate the SDR content 1010 from media content including the SDR content 1010, the HDR content 1020, and the meta data 1030, and play the separated SDR content 1010.

In another example, referring to FIG. 11, the media player 1100 may separate single codec content from multi-codec content. For example, in a case in which the codec A content includes SDR, codec B content includes HDR, and codec C content includes meta data, the media player 1100 may separately play only a specific codec content. Alternatively, the media player 1100 may separately play only content of a specific media profile.

In a specific example, in a case in which, among the plurality of pieces of codec content, the codec A content includes SD SDR, codec B content includes HD SDR, codec C content includes UHD (4K) SDR, codec D content includes UMD (8K) SDR, codec E content includes SD HDR, codec F content includes HD HDR, codec G content includes UHD (4K) HDR, and codec H content includes UHD (8K) HDR, the media player 1100 may separately play only specific codec content or separately play content of a specific media profile.

In another example, the media player 1100 may selectively convert and separate SDR content of a specific media profile from HDR content including various media profiles.

Figure 12:
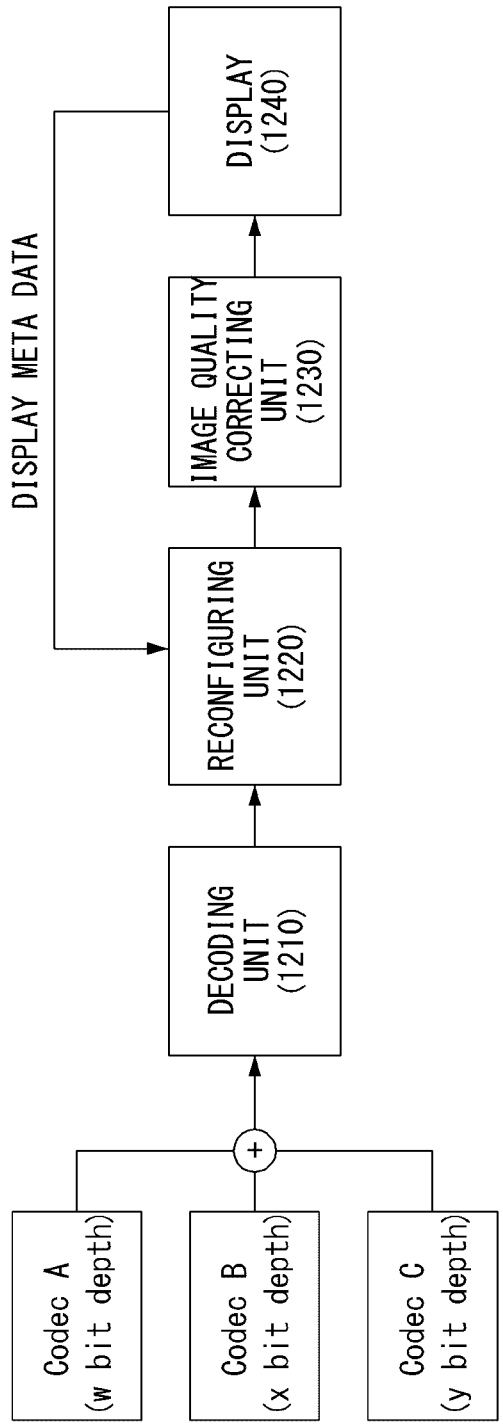
FIG. 12 is a block diagram illustrating a process of playing single content including a plurality of codecs and bit rates, according to an embodiment to which the present invention is applied.

FIG. 12 is a block diagram illustrating a process of playing single content including a plurality of codecs and bit rates, according to an embodiment to which the present invention is applied.

In a case in which single content has a plurality of codecs and different bit rates or bit depths, when the plurality of codecs are decrypted and reconfigured, a player may previously receive information of a display and configure a picture having a specific codec, a bit rate, or a bit depth For example, referring to FIG. 12, in a case in which content including a codec A having a w bit depth, a codec B having an x bit depth, and a codec C having a y bit depth is received, the player may decode the content through a decoding unit 1210.

A reconfiguring unit 1220 may reconfigure a picture using meta data received from the display. The reconfigured picture may be corrected in image quality through an image quality correcting unit 1230. The corrected picture may be output through a display 1240.

Here, the meta data may include a physical display factor, brightness or contrast may be increased or decreased through the physical display factor.

In another embodiment of the present invention, a method for supporting dual-codec is provided.

First, a case in which single content supports both an HEVC codec and an AVC codec will be described.

In a first example, in a case in which the HEVC codec and the AVC codec support different color depths, when content is decoded and subsequently reconfigured, an output color depth may be set to a specific bit depth.

The output color depth needs to be supported to correspond to a bit depth of the display, and thus, in a case in which data of input content is greater than displayed data, an output interface needs to be supported through clipping or selective cropping.

In a second example, in a case in which the HEVC codec and the AVC codec support the same bit depth (color depth), when content is decoded and subsequently reconfigured, an output color depth may be set to be equal to or greater than the bit depth. For example, in a case in which the HEVC codec and the AVC codec equally support 10 bits, the output color depth may be set to 10 bits or greater. here, the output color depth may be determined by meta data transmitted from the display.

In another embodiment, a case in which the same codec is supported but bit depths are different will be described.

In a specific example, in a case in which a HEVC codec (10 bits) and a HEVC coded (12 bits) support single content, when content is decoded and subsequently reconfigured, an output color depth may be set to a specific bit depth. For example, a higher value or a lower value, among two bit depths, may be set as a reference. Alternatively, content may be reconfigured with bits (for example, 16 bits) greater than the bits of the HEVC codec.

Figure 13:
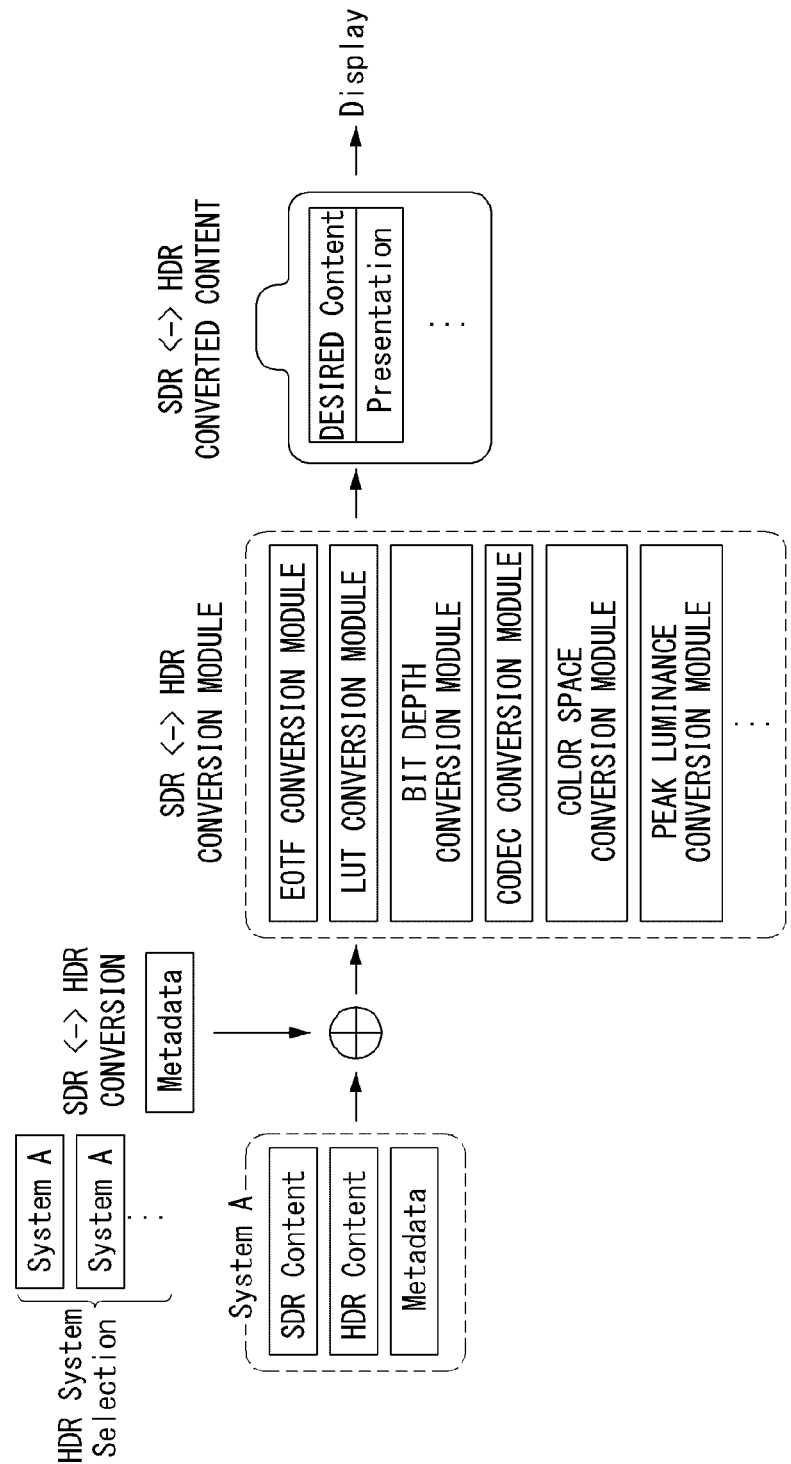
FIG. 13 is a view illustrating a system structure for describing SDR/HDR conversion, according to an embodiment to which the present invention is applied.

FIG. 13 is a view illustrating a system structure for describing SDR/HDR conversion, according to an embodiment to which the present invention is applied.

The present invention provides an HDR support system architecture in a player. For example, in using high definition content stored in a BD, a method of converting the high definition content into high luminance content by using meta data or other information and displaying the same may be provided.

Also, the present invention may provide a method for converting digital content newly created from content stored in a BD or a different storage into desired video enhancement form and displaying the same or storing the same in a memory.

Any one of a plurality of systems may be selected, and content conversion may be performed on a plurality of pieces of content included in the selected system.

For example, referring to FIG. 13, among a plurality of systems including system A and system B, the system A may be selected, and here, the system A may include SDR content, HDR content, and meta data.

In order to convert content into a desired video enhancement form, the system A may use the following conversion method.

For example, a conversion module may be used to perform conversion between the SDR content and the HDR content, and the conversion module may include at least one of a peak luminance conversion module, a lookup table (LUT) conversion module, a bit depth module, a color space conversion module, an electrooptical transfer function (EOTF) conversion module, and a codec conversion module.

Here, meta data received through the peak luminance information may be used in the EOTF conversion module and the LUT conversion module. The codec module may determine which route it will pass through in a player. For example, the codec module may determine whether to use an HEVC conversion module or whether to use an AVC conversion module.

First, the peak luminance module may set an SDR/HDR content conversion reference by using an absolute value and a relative value of peak luminance. For example, SDR peak luminance may set to 100 nits, 450 nits, or 500 nits. In a case in which the SDR peak luminance is set to 100 nits, the 100 bits may become an absolute value and meta data required for converting desired SDR/HDR content from the absolute value to a relative value may be defined.

In another example, in a case in which HDR peak luminance is defined with an absolute value, for example, defined as 1000 nits, 2000 nits, and 5000 nits, peak luminance regarding the corresponding values and peak luminance relative values may be checked, and thereafter, meta data required for conversion of SDR/HDR content may be defined.

Here, meta data regarding each system may be defined. In a first embodiment, in a case in which peak luminance of the display is known, when a specific system is determined, peak luminance of content can be known. Also, a corresponding conversion module (EOTF, LUT conversion) may be used.

If peak luminance of the display is 1000 nits, a user may select image quality to be actually displayed using an HDR selection mechanism. If image quality using the EOTF and LUT conversion scheme is better than that when the peak luminance is set to 800 nits in the display whose peak luminance is 1000 nits, contents of currently connected display mode setting may be stored.

In a second embodiment, in a case in which peak luminance of the display is not known, when a specific system is determined, peak luminance of HDR content can be known. In this case, the user may select an optimal display state by using a corresponding conversion module (EOTF, LUT conversion).

Figure 14:
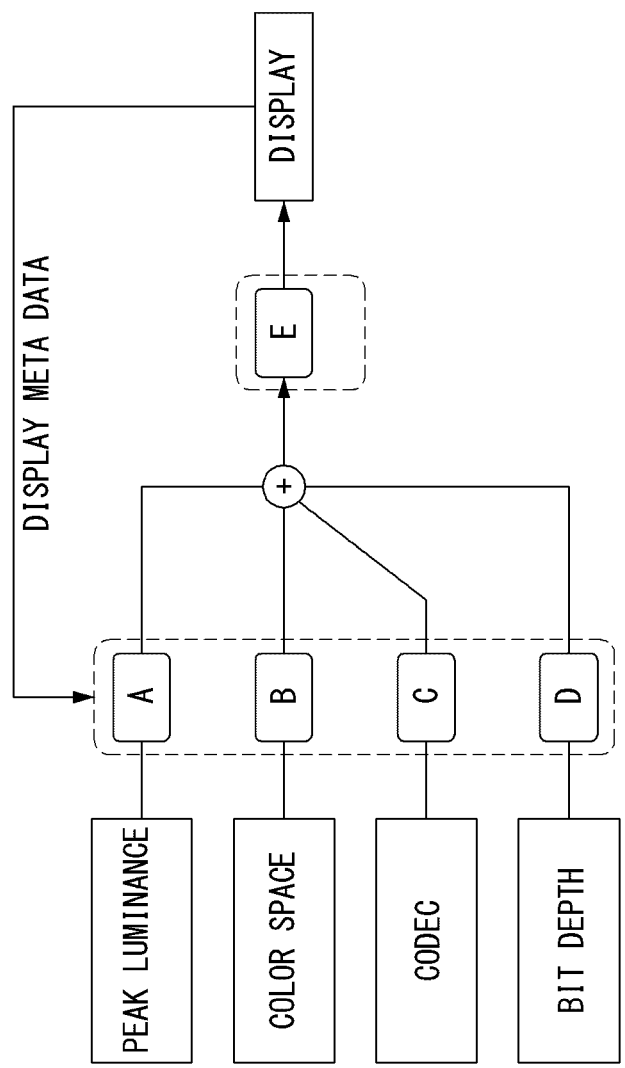
FIG. 14 is a detailed block diagram of content conversion based on meta data, according to an embodiment to which the present invention is applied.

FIG. 14 is a detailed block diagram of content conversion based on meta data, according to an embodiment to which the present invention is applied.

A system to which the present invention is applied may receive display meta data and perform content conversion on the basis of the received meta data.

For example, referring to FIG. 14, A may perform appropriate EOTF conversion and LUT conversion by comparing peak luminance of the display and content peak luminance. B may perform appropriate EOTF conversion and LUT conversion by comparing color space of the display and color space of content.

C may perform appropriate conversion by comparing the display meta data and content codec. Also, C may check meta data having codec dependency, select appropriate codec, and induce indirect meta data selection.

D may perform appropriate image quality correction conversion by comparing a bit depth of the display and a bit depth of content. Here, when the bit depth of the display is smaller than the bit depth of the content, D may reduce the bit depth of the content, and when the bit depth of the display is greater, D may output the content as is. Meanwhile, D may decode content bits and reconfigure the same to decrease or increase a bit depth.

E may select digital content to be displayed.

Figure 15:
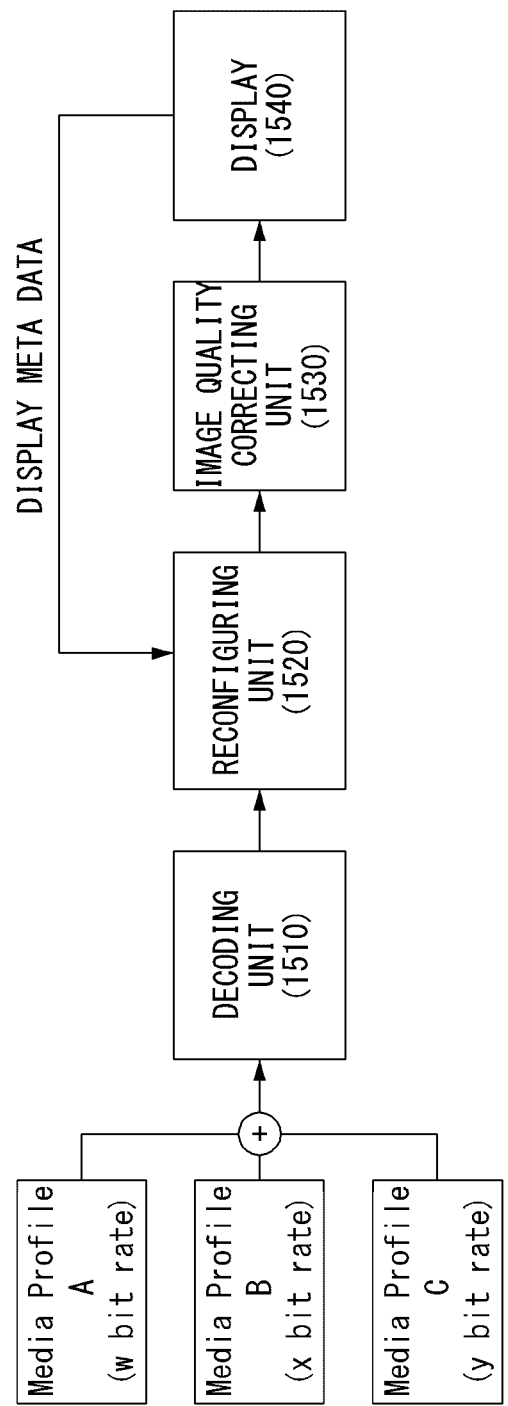
FIG. 15 is a block diagram illustrating a process of playing single content including a plurality of profiles and bit rates, according to an embodiment to which the present invention is applied.

FIG. 15 is a block diagram illustrating a process of playing single content including a plurality of profiles and bit rates, according to an embodiment to which the present invention is applied.

In a case in which single content has a plurality of codecs and different bit rates or bit depths, when the plurality of codecs are decrypted and reconfigured, a player may previously receive information of a display and configure a picture having a specific codec, a bit rate, or a bit depth For example, referring to FIG. 15, in a case in which content including a media profile A having a w bit rate, a media profile B having an x bit rate, and a media profile C having a y bit rate is received, the player may decode the content through a decoding unit 1510.

A reconfiguring unit 1520 may reconfigure a picture using meta data received from the display. The reconfigured picture may be corrected in image quality through an image quality correcting unit 1530. The corrected picture may be output through a display 1540.

An embodiment of the present invention provides a method for supporting single codec.

In a case in which an HEVC codec supports only specific bits such as 10 bits or 12 bits, a picture conversion algorithm that may be mapped to the corresponding bits may be applied. Also, an output color depth may be the same color depth as that supported by the single codec or may be adjusted to a different color depth matched to the display.

Figure 16:
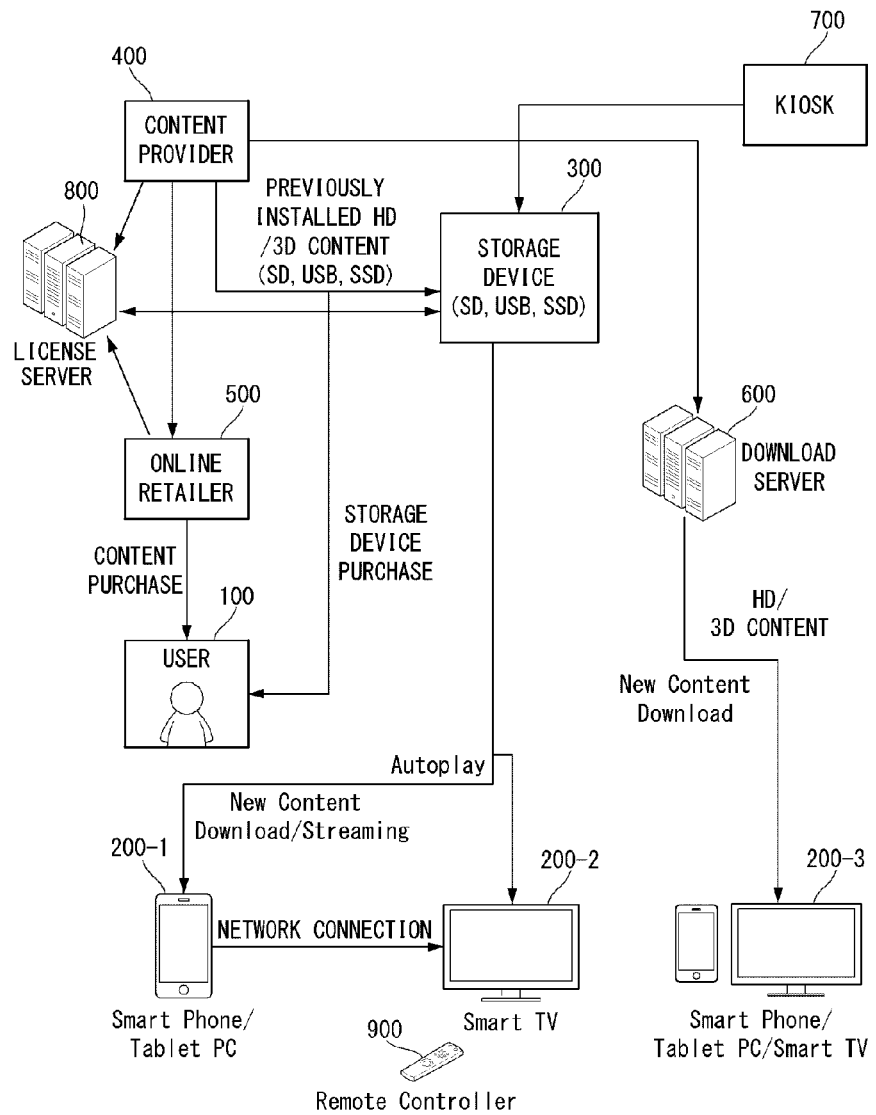
FIG. 16 is a view illustrating a system for using a high definition content service, according to an embodiment to which the present invention is applied.

FIG. 16 is a view illustrating a system for using a high definition content service, according to an embodiment to which the present invention is applied.

A system to which the present invention is applied may include a user 100 who purchases secure high definition content and uses the same, playback devices 200-1, 200-2, and 200-3 capable of playing the content, a storage device 300 in which the content has been stored or in which the content may be stored, a content provider 400 providing the content, a retailer 500 and an electronic kiosk 700 receiving the content and providing the received content to the user, and a download server 600 storing the content to allow the content to be downloaded, and a license server 800 providing license information allowing the content to be played. Also, the system may further include an external interface 900, for example, a remote controller, for controlling an operation of the playback devices.

The secure high definition content described in this disclosure may refer to SCSA content, but the present invention is not limited thereto.

In an embodiment to which the present invention is applied, the user who wants to use a secure high definition (HD) content service may use the service through various methods. The secure HD content may include, for example, secure content storage association (SCSA) content, and content mentioned in this disclosure may include the SCSA content.

In a first example, the user 100 may use the service by purchasing a storage device in which the secure high definition content has already been stored. For example, the content provider 400 may preload content, which is intended to be provided, to a portable hard drive such as a hard disk drive (HDD) or a solid state drive (SSD) or a flash memory product such as a universal serial bus (USB) flash drive or a secure digital (SD) card, and purchase the same, and the user may use the service by purchasing the storage device storing desired content.

In a second example, the user 100 may use the service by purchasing content from a retailer 500 providing the secure high definition content service. For example, the retailer 500 may receive content from the content provider 400 and provide the content service online or offline, and the user 100 may use the service by properly purchasing content from the retailer 500. Also, the user 100 may also use the service by purchasing the storage device from the retailer 500.

In this case, the retailer 500 may provide transaction information corresponding to content purchase to the user 100. Here, the transaction information is information regarding content transaction activity, which may refer to aggregation information of right information.

For example, the transaction information may correspond to one content item purchased by the user, and the right information may be information indicating a status for issuing a license for a storage device. Here, the one content item may include at least one content among SD, HD, UHD version content, and the content of each version is related to one right information.

The transaction information may include at least one of a serial number used for uniquely referring to each transaction, transaction identification information uniquely identifying each transaction, transaction status information indicating a status of a transaction, a transaction generation time information indicating a generation time of a transaction, a transaction identifier list provided by a retailer, a transaction type information identifying a transaction type, and retailer information who has created the right information or the transaction information. Here, the transaction identification information may provide a unique link regarding a corresponding transaction.

In a third example, the user 100 may play the content by inserting the storage device 300 storing secure high definition content into the playback device 200-1. For example, the playback device 200-1 may be any device which may be able to play multimedia content, such as a mobile device, a TV, a computer, a notebook computer, and a tablet PC.

In a fourth example, the user 100 may insert the storage device 300 in which the secure high definition content has been stored or may be stored into the first playback device 200-1, and play the content in the second playback device 200-2. Here, the first playback device 200-1 and the second playback device 200-2 may be connected by a network, and when the storage device 300 is inserted into the first playback device 200-1, power of the second playback device 200-2 may be automatically turned on. Also, content may be played in the second playback device 200-2 through an external interface (for example, the remote controller 800, or the like) or a user interface (for example, a touch screen, a voice, a gesture, and the like).

In a fifth example, the user 100 may insert the storage device 300 capable of storing secure high definition content into the playback device 200-3 and download the content from an external content server to thus play the content. Here, the content may be stored in the storage device 300, and the external content server may be a content server of the content provider 400 or the retailer 500.

In order to play the secure high definition content, a specific application may be required. The specific application mentioned in this disclosure may refer to a software program for playing secure high definition content. For example, the specific application may refer to a software program capable of playing copy-prevented high definition content which has been stored or may be stored in a portable hard drive such as an HDD or SSD or in a flash memory product such as a USB flash drive or an SD card.

In particular, in the case of a playback device unable to reproduce the secure high definition content, installation of the specific application may be essential to play the content.

Figure 17:
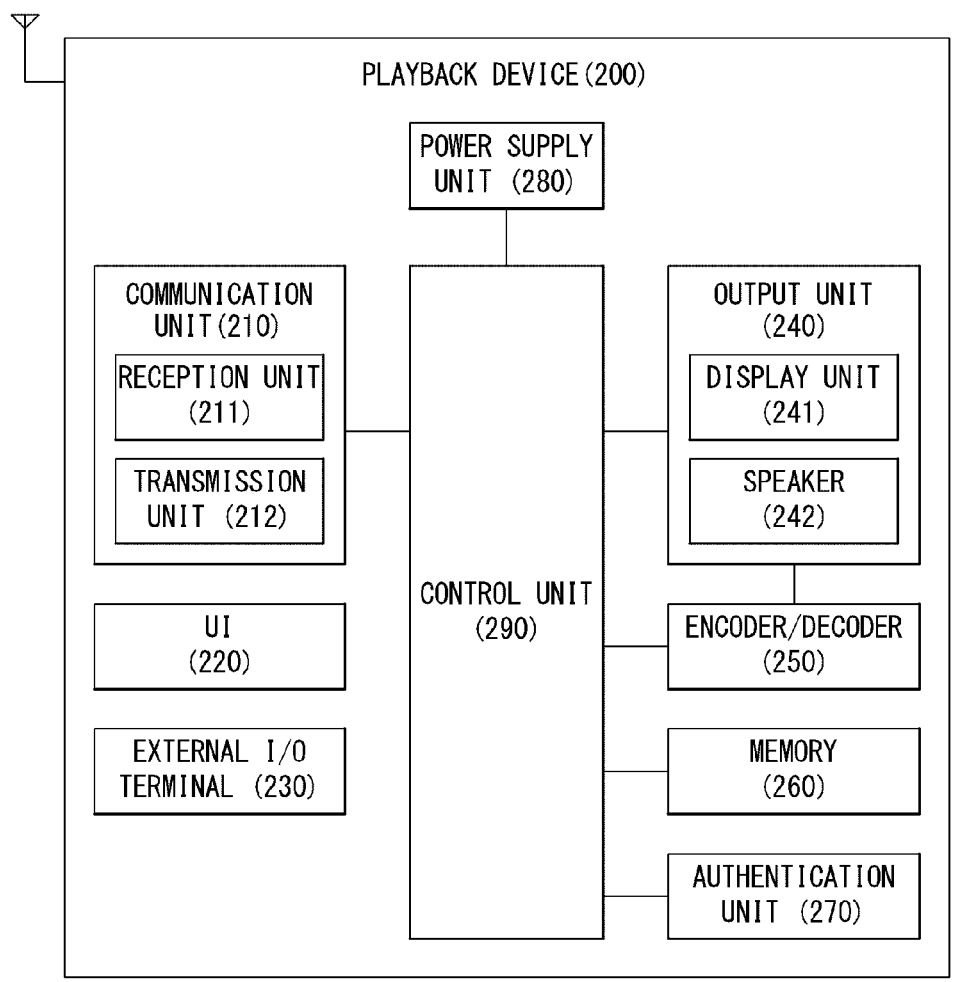
FIG. 17 is a schematic internal block diagram of a playback device for playing SCSA content, according to an embodiment to which the present invention is applied.

FIG. 17 is a schematic internal block diagram of a playback device for playing SCSA content, according to an embodiment to which the present invention is applied.

The playback device 200 may include a communication unit 210, a user interface 220, an external input/output terminal 230, an output unit 240, an encoder/decoder 250, a memory 260, a certification unit 270, a power supply unit 280, and a control unit 290. The communication unit 210 may include a reception unit 211 and a transmission unit 212, and the output unit 240 may include a display unit 241 and a speaker 242.

The communication unit 210 may include one or more modules allowing for wired/wireless communication between the playback device 200 and the convent server or between the playback device 200 and other electronic device connected by a network. For example, the reception unit 211 may receive a signal transmitted from the content server or the other electronic device through a channel. Here, the signal may include secure high definition content data. The transmission unit 212 may transmit information required for downloading or streaming the secure high definition content data to the content server or the other electronic device. For example, the information required for downloading or streaming the secure high definition content data may include at least one among identification information, transaction information, license information, level information, and certificate information of the playback device and/or the storage device. Here, the license information may be information allowing purchased content to be played and may include at least one of license file information and license key information, for example.

The user interface 220 serves to transfer input information from the user to the playback device 200. For example, in order to control playing of the secure high definition content, in order to input information required for purchasing or certification procedure, or in order to perform setting for playing in other electronic device, the user interface 220 may be used. The user interface 220 may include a touch screen unit (not shown), a voice recognition unit (not shown), or a gesture recognition unit (not shown), and may be a separate external device such as a remote controller.

The external input/output terminal 230 may serve as a passage with an external device connected to the playback device 200. The external input/output terminal 230 may receive data or power from an external device and transfer the same to each component of the playback device 200, or transmit data within the playback device 200 to an external device. For example, the external input/output terminal 230 may be a connection terminal for connection with the storage device 300 and may include at least one among a USB port, a HDMI port, a wired/wireless headset port, an external charger port, a wired/wireless data port, a memory card port, an audio input/output (I/O) port, a video I/O port, and an earphone port. The storage device 300 and the playback device 200 may communicate through the external input/output terminal 230.

The output unit 240, serving to generate an output related to sight and hearing, may include the display unit 241 and the speaker 242.

The display unit 241 may output visual information processed in the playback device 200. For example, the display unit 241 may output secure high definition content, output information indicating that the storage device 300 has been plugged in, or output information required for a process of purchasing or certifying content. The display unit 241 may include at least one among a liquid crystal display (LCD), a thin film transistor liquid crystal display (TFT LCD), an organic light emitting diode (OLED), a flexible display, and a 3D display.

The speaker 242 may output acoustic information processed in the playback device 200. For example, the speaker 242 may output audio information of content or information required for playing the content, as voice information.

The encoder/decoder 250 may be used to perform decoding to display the secure high definition content or may be used to encode an image signal or an audio signal input from the playback device 200.

The memory 260 may store a program for operation of the control unit 290 or may temporarily store input/output data. For example, the memory 260 may store a specific application for playing the secure high definition content or may store identification information, profile information, level information, and certificate information of the playback device 200 and meta data of the content.

The memory 260 may include at least one type of storage mediums among a flash memory type, a hard disk type, a multimedia card micro-type, a card-type memory (e.g., an SD or XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. Also, the playback device 200 may operate in relation to a Web storage performing a storage function of the memory 260 on the Internet.

The certification unit 270 may decrypt encrypted content to play the content. Here, the certification unit 270 may perform a response checking process regarding key information, and may transmit and receive right information of a storage device or a playback device.

The power supply unit 280 may receive external power and/or internal power and supply power required for operation of each component under the control of the control unit 290.

The control unit 290 controls a general operation of the playback device 200. For example, the control unit 290 may control an operation of detecting whether the storage device 300 is connected, receiving certificate information from the detected storage device, or transmitting the received certificate information to a server. Also, the control unit 290 may control an operation of receiving an encrypted media file and a certificate list (or a certificate revision list (CRL)) from the server on the basis of the certificate information, storing the encrypted media file to the storage device, update the certificate list, or playing the encrypted media file on the basis of the updated certificate list.

Figure 18:
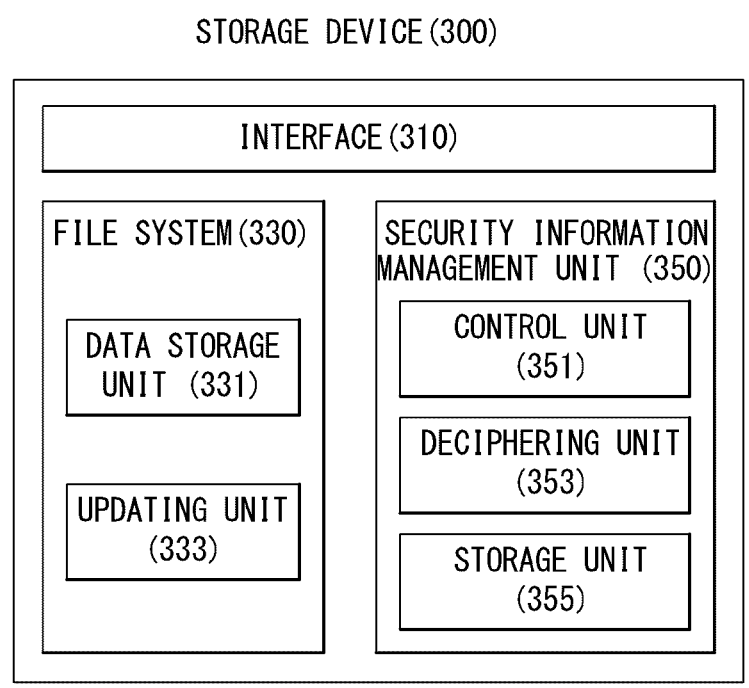
FIG. 18 is a schematic internal block diagram of a storage device for storing SCSA content, according to an embodiment to which the present invention is applied.

FIG. 18 is a schematic internal block diagram of a storage device for storing SCSA content, according to an embodiment to which the present invention is applied.

The storage device 300 to which the present invention is applied may include an interface 310, a file system 330, and a secure information management unit 350. The file system 330 may include a data storage unit 331 and an updating unit 333, and the secure information management unit 350 may include a control unit 351, a decryption unit 353, and a storage unit 355.

The interface 310 serves as a passage with an external device connected to the storage device 300. For example, when the storage device 300 is plugged in to a playback device, the storage device 300 may receive data from the playback device or transmit internal data of the storage device 300 to the playback device through the interface 310.

The data storage unit 331 may store license information, password information, and the certificate revision list required for playing the encrypted multimedia content data.

The updating unit 333 may receive the certificate revision list and synchronize the received certificate list with previously stored certificate list, thus updating the certificate list. Here, the certificate revision list may be received from the playback device or an external server.

The secure information management unit 350 may be connected to a license server through the playback device, and may perform a handshake process with the license server regarding the license information, the password information, and the certificate list required for playing content. The control unit 351 of the secure information management unit 350 may control the forgoing process, and the decryption unit 353 may decrypt the license information or the password information. The storage unit 355 may store the license information and/or the password information, and the storage unit 355 may be a secure region within the storage device 300.

Figure 19:
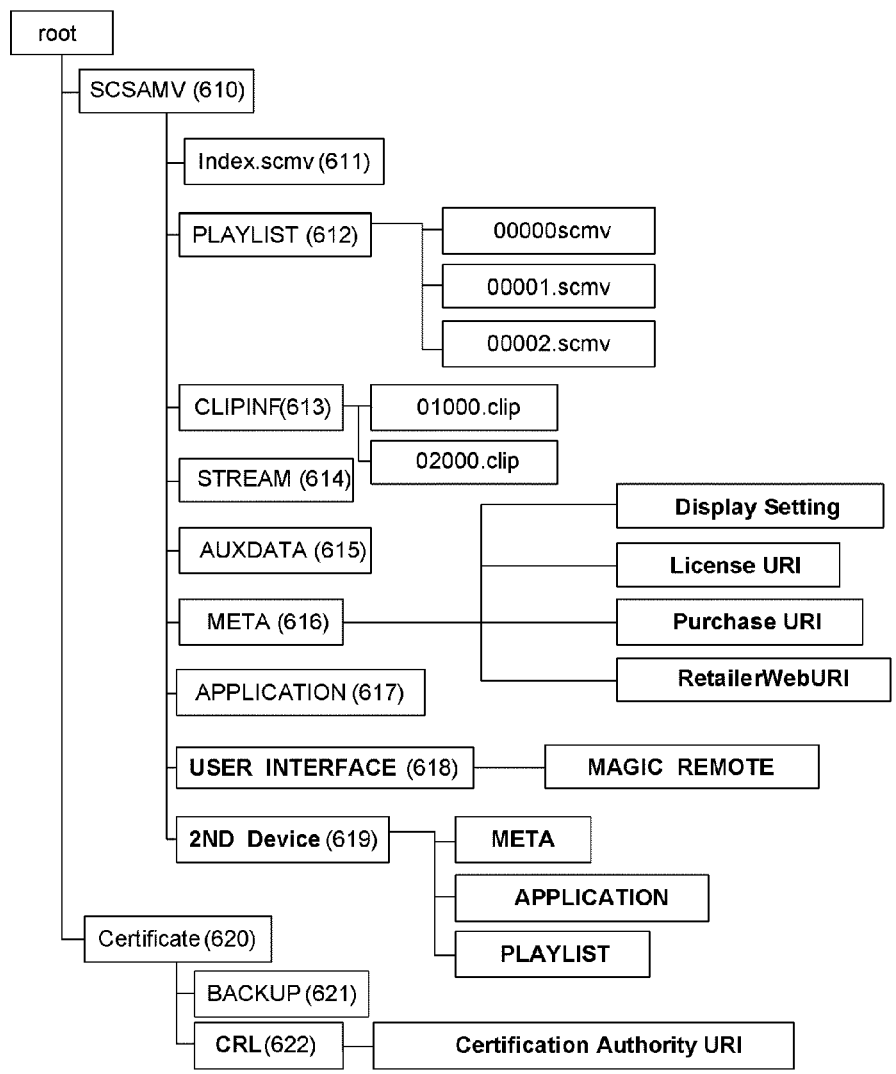
FIG. 19 is a view illustrating a data directory structure for managing SCSA content, according to an embodiment to which the present invention is applied.

FIG. 19 is a view illustrating a data directory structure for managing SCSA content, according to an embodiment to which the present invention is applied.

The data directory structure for managing HD content may be divided into a HD content image directory (SC-SAMV) 510 and a certificate directory 520 from a root directory.

The HD content image directory 510 may include an index directory 511, a play list directory 512, a clip directory 513, a stream directory 514, an additional data directory 515, a meta data directory 516, an application directory 517, a user interface directory 518, and a second device directory 519. The play list directory 512 may include play items such as 00000.scmv, 00001.scmv, and 00002.scmv.

The clip directory 513 may include clip items such as 01000.clip and 02000.clip.

The meta data directory 516 may include information such as display setting, license uniform resource locator (URI), a purchase URI, and a retailer URI. For example, the meta data directory 516 may include movie advertisement information, retailer information, and display setting information. Here, the movie advertisement information may include a license URI, a purchase URI, and the retailer information may include a retailer name and a Web site URI. The display setting information may include brightness, contrast, gamma, frame rate, and color depth information according to display mode information (for example, movie, sports, drama, and music).

The user interface directory 518 may include information regarding a separate external input device. The second device directory 519 may include meta data of the second device, an application of the second device, and a play list of the second device. For example, the meta data of the second device may include information of a clip name, a play time, a director, and an actor, the application of the second device may include information of a platform, a name, and an installation URI, and the play list of the second device may include information of a play start time, a play end time, an object type, an object file or an object address, description information of a corresponding object, an execution command.

Meanwhile, the certificate directory 520 may include a backup 521 and a certificate list 522, and the certificate list 522 may include certification right address information, playback device certificate information, and storage device certificate information.

Figure 20:
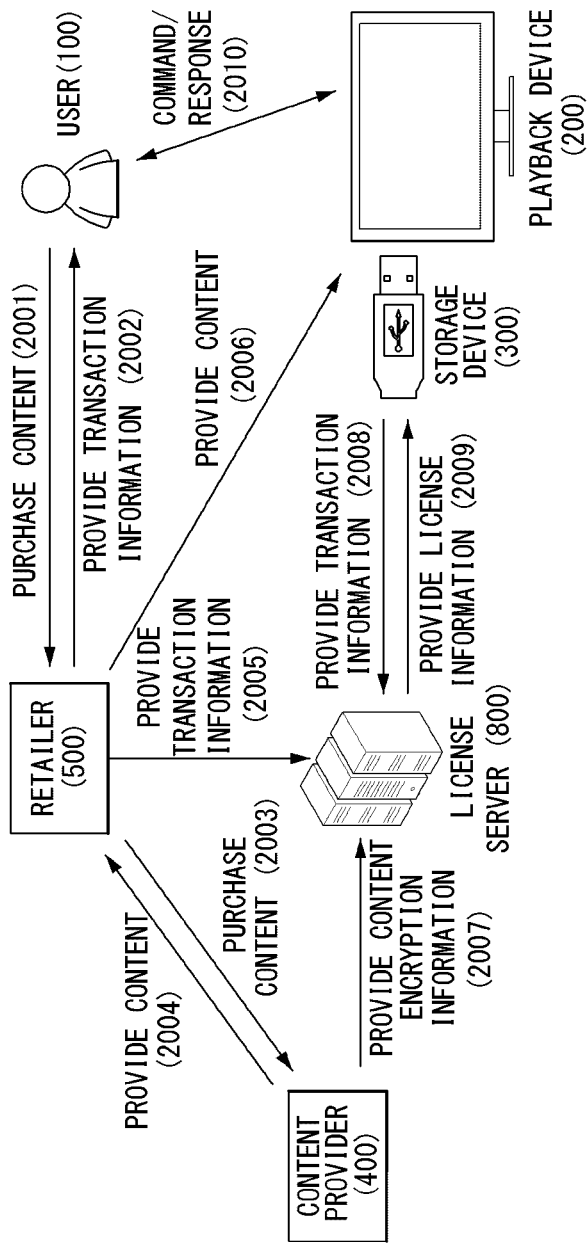
FIG. 20 is a view illustrating a network system structure for obtaining license information for playing SCSA content stored in a storage device, according to an embodiment to which the present invention is applied.

FIG. 20 is a view illustrating a network system structure for obtaining license information for playing SCSA content stored in a storage device, according to an embodiment to which the present invention is applied.

In order for the user to purchase HD content and play it in a playback device, the user needs to obtain at least one of transaction information and license information corresponding to the HD content. Here, the transaction information refers to information regarding a content transaction activity, which may refer to aggregation information of right information. The transaction information and the right information are the same as those described above with reference to FIG. 16. The license information is information allowing purchased content to be played and may include at least one of license file information and license key information, for example.

In the present embodiment, a process of obtaining license information to play HD content will be described.

Referring to FIG. 20, the user 100 may purchase secure HD content from the retailer 500 (2001). In the present embodiment, the retailer 500 is taken as an example, but content may also be purchased through any other route or other content retainer, for example, the content provider 400 or other user.

The retailer 500 may also request content purchase from the content provider 400 or another retailer 500 (2003), and may be provided with content therefrom (2004).

Upon receiving the purchase request from the user 100, the retailer 500 may provide the right to play HD content to the user through generation of transaction information. For example, the retailer 500 may provide transaction information to the user 100 (2002), and provide transaction details to the license server 800 (2005). Here, the provided transaction information may be stored in the storage device 300 and may correspond to one HD content. The HD content may be provided as content of a plurality of versions, and may be provided as one or more of SD, HD, UHD class content. Also, the retailer 500 may provide HD content to the storage device 300 (2006).

The license server 800 may include an interface and data required for determining whether the storage device has the right to play content. The license server 800 may receive the transaction details from the retailer 500, receive content code information from the content provider 400 (2007), and receive the transaction information from the storage device 300 (2008).

The license server 800 may generate transaction information on the basis of the transaction details. Also, the transaction information may be generated by the retailer 500.

Meanwhile, the user 100 may request the playback device 200 to play the purchased HD content through an interface. Here, the transaction information stored in the storage device 300 may be transmitted to the license server 800, and the license server 800 may check whether there is right to play on the basis of the transaction information. When it is checked that there is right to play, the license server 800 may generate right information and license information and transmit the generated right information and license information to the storage device 300 (2009). Here, the license information is information allowing the purchased content to be played, and may include at least one of license file information and license key information.

Upon receiving the right information and the license information, the storage device 300 may play the HD content.

Figure 21:
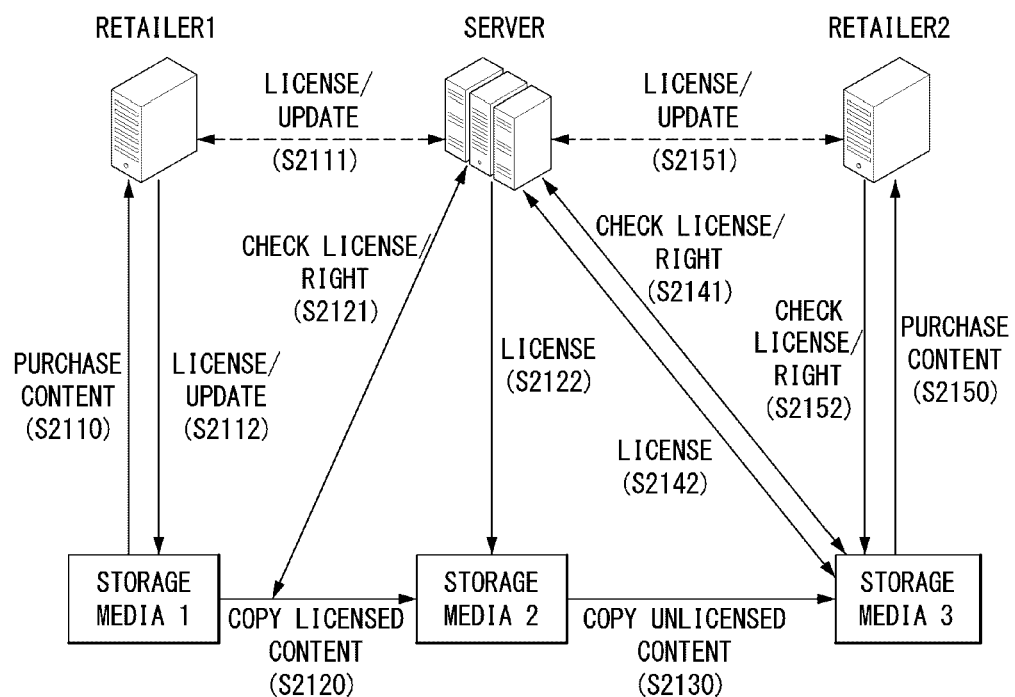
FIG. 21 is a flow chart illustrating a process of licensed copying and unlicensed copying of SCSA content between storage devices, according to an embodiment to which the present invention is applied.

FIG. 21 is a flow chart illustrating a process of licensed copying and unlicensed copying of SCSA content between storage devices, according to an embodiment to which the present invention is applied.

The secure HD content may be copied or moved from one storage device to another storage device. Here, the license server may provide the right for valid copying or movement.

First, when a storage media 1 purchases secure high definition content from a retailer 1 (S2110), the retailer 1 may report contents of the content purchase to a server. Here, the server may refer to a license server. The server may provide a valid license regarding the content purchase to the retailer 1, and update a certificate list stored in the server (S2111). Here, the certificate list may include at least one of a content title certificate list, a storage device certificate list, a playback device certificate list, and a license certificate list.

The retailer 1 may provide a valid license regarding the content purchase to the storage media 1, and update the certificate list stored in the retailer 1 (S2112).

In another embodiment, in a case in which content properly purchased from the storage media 1 is intended to be copied to a storage media 2 (S2120), the server may determine whether the storage media 2 has authority to play the content or whether the content may be copied (S2121). When the storage media 2 has authority to play the content or the content may be copied according to the determination, copying of the content by the storage media 2 may be performed and the server may provide license information for playing the content to the storage media 2 (S2122). Here, the storage media 2 may need to have capability of playing the content.

In another embodiment, when the content is intended to be copied invalidly (unlicensed copy) from the storage media 2 to a storage media 3 (S2120), only a data file of the content may be copied from the storage media 2 to the storage media 3 and a certification procedure through the server is not performed (S2130). However, when the storage media 3 intends to play the content, a new license may need to be issued.

In another embodiment, when the storage media 3 intends to play the content, the storage media 3 may request the right to play the content from the server (S2141), and accordingly, the server may provide the right to play the content to the storage media 3 (S2142).

However, when the right to play the content expires, the storage media 3 should newly purchase content from the retailer 2 (S2150). When purchasing new content through the retailer 2 is completed, the retailer 2 may transmit the purchase information to the server and the server may update the certificate list stored in the server on the basis of the new purchase information (S2151). The retailer 2 may provide a valid license regarding the content purchase to the storage media 3, and update a certificate list stored in the retailer 2 (S2152).

Figure 22:
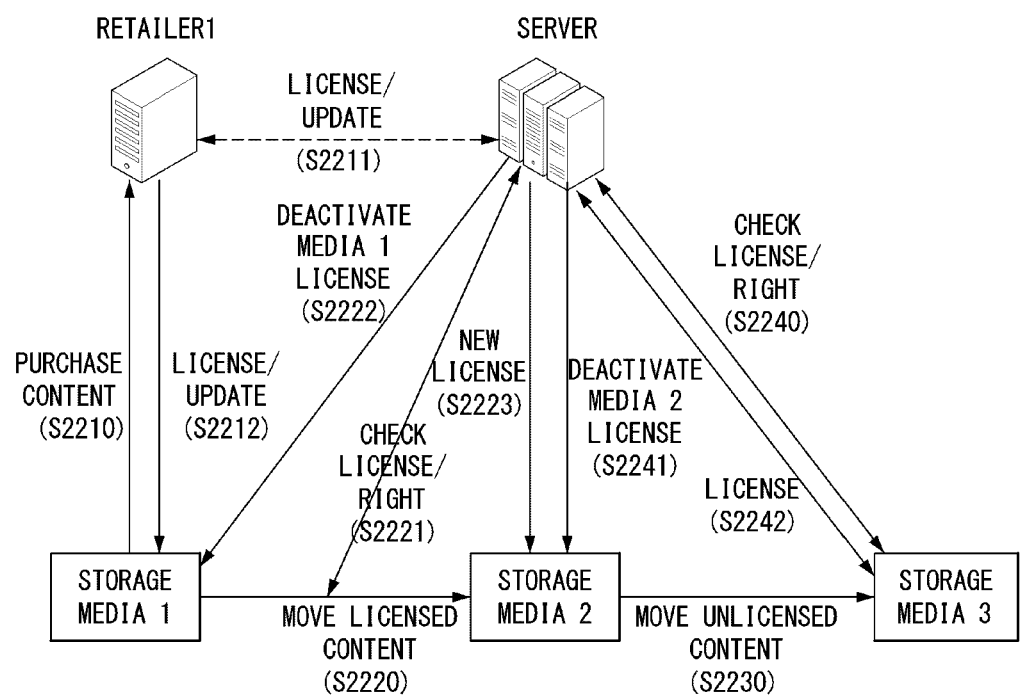
FIG. 22 is a flow chart illustrating a process of licensed moving and unlicensed moving of SCSA content between storage devices, according to an embodiment to which the present invention is applied.

FIG. 22 is a flow chart illustrating a process of licensed moving and unlicensed moving of SCSA content between storage devices, according to an embodiment to which the present invention is applied.

The secure high definition content may be moved from one storage device to other storage device. Here, movement may refer to transfer of a content file to a destination storage media having an activated license. The movement may be performed by a playback device having capability of playing the secure high definition content. The destination storage media may be able to store the secure high definition content. Here, the server may provide the right to move content validly.

First, when the storage media 1 purchases secure high definition content from the retailer 1 (S2210), the retailer 1 may report contents of the content purchase to the server. The server may provide a valid license regarding the content purchase to the retailer 1, and update a certificate list stored in the server (S2211). Here, the certificate list may include at least one of a content title certificate list, a storage device certificate list, a playback device certificate list, and a license certificate list.

The retailer 1 may provide a valid license regarding the content purchase to the storage media 1, and update the certificate list stored in the retailer 1 (S2212).

In another embodiment, in a case in which content properly purchased from the storage media 1 is intended to be moved to the storage media 2 (S820), the server may determine whether the storage media 2 has the right to move the content or whether the content may be copied (S2221). When the storage media 2 has the right to move the content or the content may be moved according to the determination, movement of the content by the storage media 2 may be performed and the server may deactivate the license which has been provided to the storage media 1 (S2222), and provide new license information for playing the content to the storage media 2 (S2223).

In another embodiment, when the content is intended to be moved invalidly (unlicensed movement) from the storage media 2 to a storage media 3 (S2230), only a data file of the content may be moved from the storage media 2 to the storage media 3 and a certification procedure through the server is not performed. However, when the storage media 3 intends to play the content, a new license may need to be issued.

In another embodiment, when the storage media 3 intends to play the content, the storage media 3 may request the right to play the content from the server (S2240). Accordingly, the server may deactivate the license which has been provided to the storage media 2 (S2241), and provide new license information for playing the content to the storage media 3 (S2242).

Figure 23:
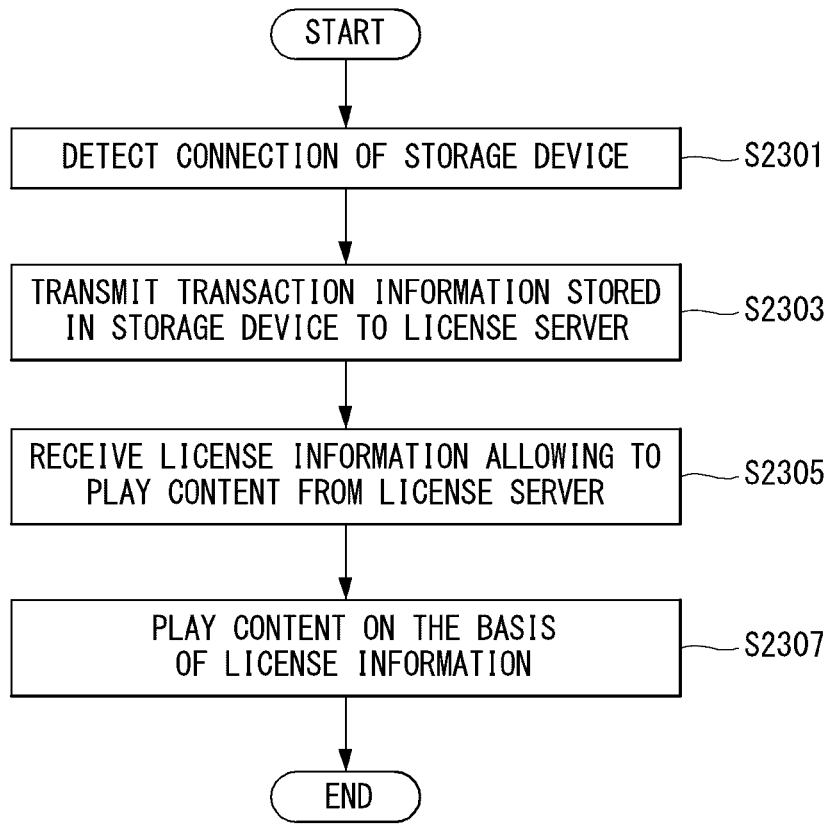
FIG. 23 is a flow chart illustrating a process of obtaining license information for playing high definition content stored in a storage device, according to an embodiment to which the present invention is applied.

FIG. 23 is a flow chart illustrating a process of obtaining license information for playing high definition content stored in a storage device, according to an embodiment to which the present invention is applied.

In order for the user to purchase HD content and play it in a playback device, the user needs to obtain at least one of transaction information and license information corresponding to the HD content.

First, when the storage device storing the secure HD content is plugged in to a playback device, the playback device may detect the plugged-in storage device (S2301). When the storage device is detected, the playback device may transmit transaction information stored in the storage device to a license server (S2303). Here, the transaction information may refer to information regarding content transaction activity, which may refer to aggregation information of right information. For example, the right information may be information indicating a status for issuing a license for a storage device. The transaction information may include transaction identification information identifying at least one of a corresponding transaction, a seller, and a user, and right information indicating a right information item of corresponding content. Here, the transaction identification information may provide a unique link regarding a corresponding transaction.

Upon receiving the transaction information, the license server may determine the right to play on the basis of the transaction information. When it is determined that the storage device has the right to play the HD content, the license server may generate right information and license information and transmit the generated right information and the license information to the storage device (S2305). Here, the license information may be information allowing the purchased content to be played, and may include at least one of license file information and license key information.

The playback device may play the HD content on the basis of at least one of the right information and the license information (S2307).

Figure 24:
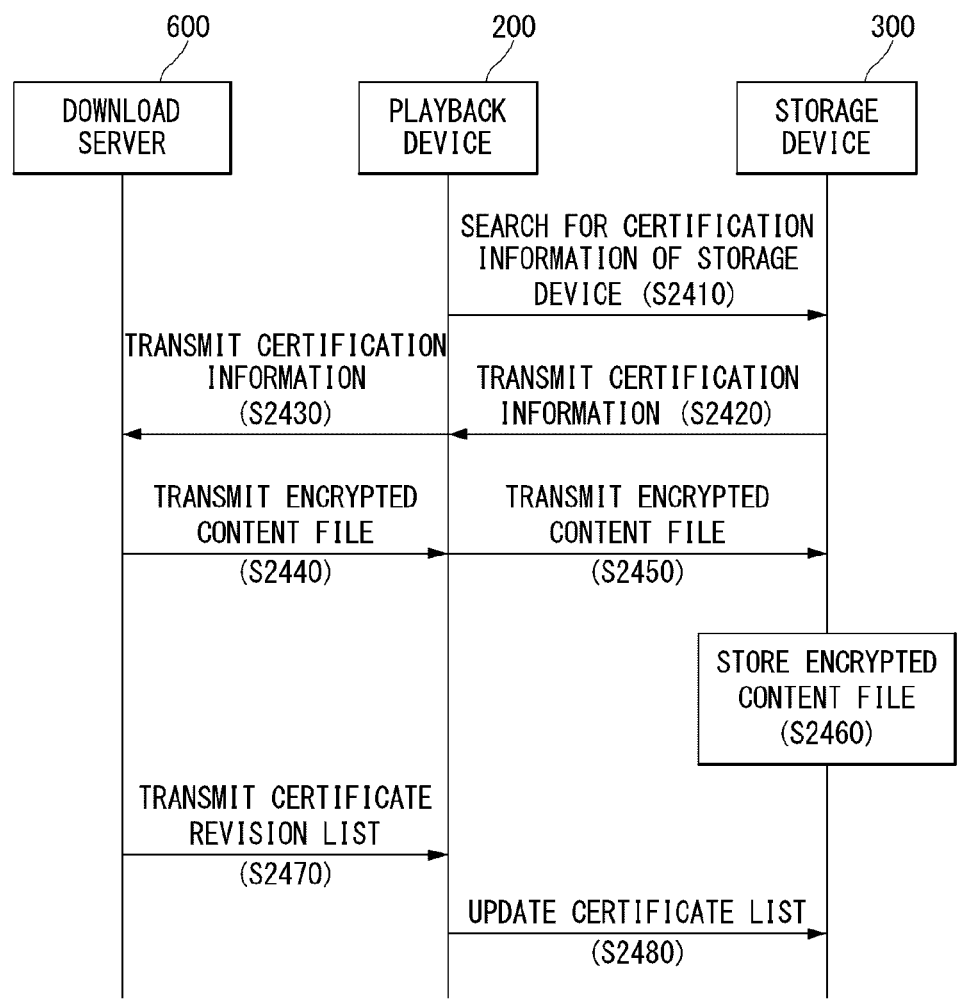
FIG. 24 is a flow chart illustrating a certification procedure for playing high definition content, according to an embodiment to which the present invention is applied.

FIG. 24 is a flow chart illustrating a certification procedure for playing high definition content, according to an embodiment to which the present invention is applied.

In order to play secure HD content, a playback device 200 may use at least one of a certificate list, encryption information, device identification information, device certificate information, storage device certificate information, and storage device identification information.

First, when a storage device storing secure HD content is plugged into the playback device 200, the playback device 200 may request device certificate information of the storage device 300 from the storage device 300 (S2410). Upon receiving the request for the device certificate information from the playback device 200, the storage device 300 transmits the device certificate information to the playback device 200 (S2420), and the playback device 200 transmits the device certificate information to a download server 600 (S2430). Here, the download server 600 refers to a server storing a content file and may include a certification server (not shown) for performing certification on content, a storage device, or a playback device.

Upon receiving the device certificate information from the storage device 300, the download server 600 may determine whether the device certificate information is valid. For example, the download server 600 may determine whether the received device certificate information is identical to any one of pieces of device certificate information managed by the download server 600. When the device certificate information from the storage device 300 is not valid according to the determination result, the playback device 200 cannot play the secure HD content.

In contrast, when the device certificate information from the storage device 300 is valid, the download server 600 transmits an encrypted content file to the playback device 200 (S2440), and the playback device 200 transmits the encrypted content file to the storage device 300 (S2450).

The storage device 300 may store the encrypted content file, and here, the received encrypted content file may be stored in a file system of the storage device 300 (S2460).

Meanwhile, the download server 600 transmits the certificate revision list to the storage device 300 (S2470). Upon receiving the certificate revision list, the storage device 300 synchronizes the received certificate revision list with a previously stored certificate list to update the certificate list (S2480). Here, the certificate list refers to a list of pieces of certificate information required for playing the secure HD content, and includes at least one of a content title certificate list, a storage device certificate list, a playback device certificate list, and a license certificate list, for example. The certificate list may be used to certify eligibility of at least one of the playback device, the storage device, and the server, and may be stored in a secure region of the storage device.

Since the certificate list of the storage device 300 is updated as described above, a secure session may be established between the storage device 300 and the playback device 200 or between the storage device 300 and the download server 600, and secure information such as a license key may be transmitted and received through the secure session.

Thus, on the basis of the updated certificate list, the playback device 200 may play the encrypted content file stored in the storage device 300. The encrypted content file may be played on the basis of a specific application installed in the playback device 200.

FIG. 25 is a view illustrating a level of high definition content and a level of a playback device playing the high definition (HD) content, according to an embodiment to which the present invention is applied.

HD content to which the present invention is applied may include content level information 2510, and the content level information 2510 indicates categorized content attribute information. Content provided in the system to which the present invention is applied may be provided as a different profile according to the content level information 2510. For example, in a case in which the content level information 1310 is "Level 1", content may correspond to a standard definition (SD) profile, and in a case in which the content level information 2510 is "Level 2", content may correspond to a high definition (HD) profile, and in a case in which the content level information 2510 is "Level 3", content may correspond to a quad-high definition (QHD) profile. The content level information 2510 may include video profile information 2511 and audio profile information 2513.

For example, in a case in which the content level information 2510 indicates "Level 1", the video profile information 2511 of content may correspond to H.264 codec, first profile (L3 profile, etc.), and resolution 480p, in a case in which the content level information 2510 indicates "Level 2", the video profile information 2511 of content may correspond to H.264 codec, second profile (high profile, etc.), and resolution 720p, 1080p, and in a case in which the content level information 2510 indicates "Level 3", the video profile information 2511 of content may correspond to H.265 codec, third profile (main profile, etc.), and resolution 1440p. Also, the audio profile information 2513 may correspond to a first profile (AAC codec, etc.), a second profile (HE-AAC codec), and a third profile (MPS, USAC, etc.).

Meanwhile, a playback device playing HD content may be provided with various levels according to capability thereof. For example, whether a playback device is able to play HD content may be determined on the basis of a level thereof. That is, a playback device cannot play content having content level information higher than device level information thereof. In a specific example, in a case in which the device level information indicates "Level 1", a corresponding playback device may play content corresponding to "Level 1", in a case in which the device level information indicates "Level 2", a corresponding playback device may play content corresponding to "Level 1" and Level 2", and in a case in which the device level information indicates "Level 1", a corresponding playback device may play content corresponding to every content level information.

In another example, whether to apply a HD content play function may be determined on the basis of a device level. Here, the play function may include playing, copying, moving, or deleting content. That is, a playback device may perform the play function on content having content level information higher than device level information thereof.

Figure 26:
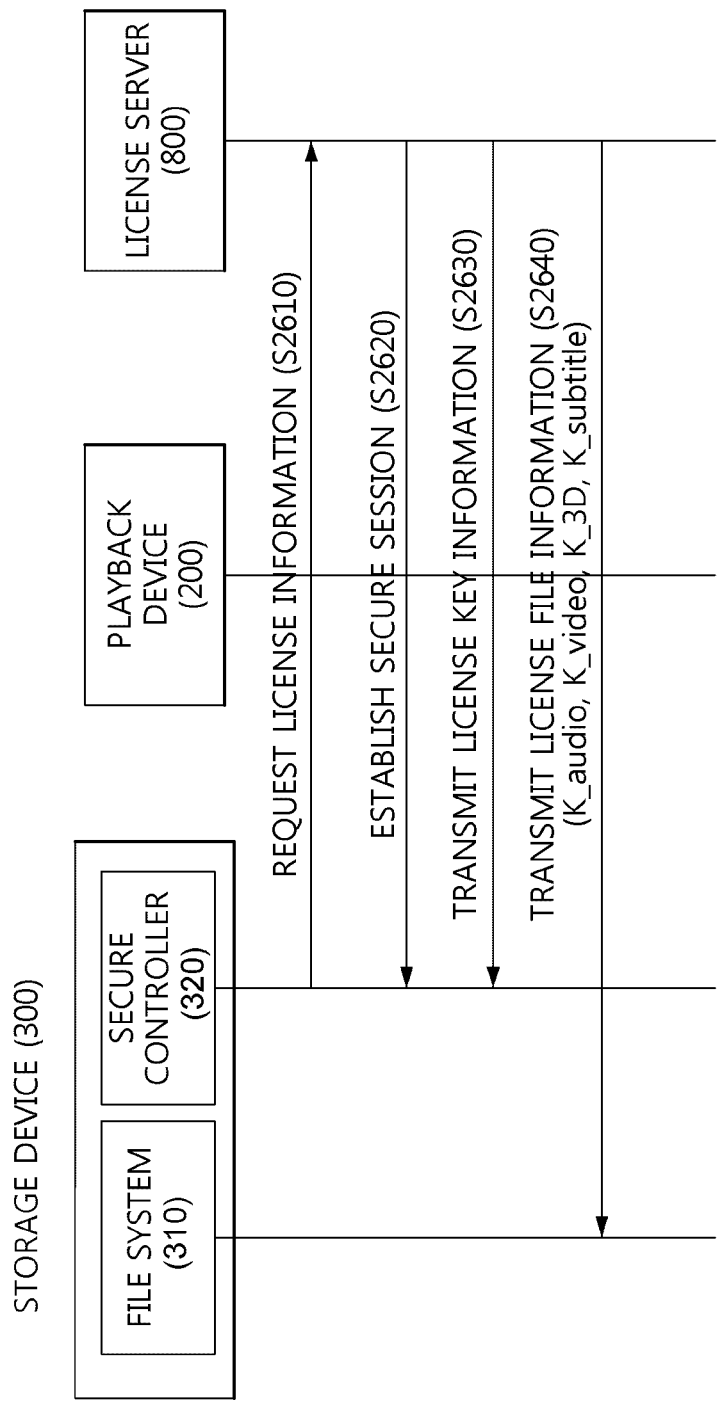
FIG. 26 is a flow chart illustrating a process of obtaining license information for playing high definition content stored in a storage device, according to an embodiment to which the present invention is applied.

FIG. 26 is a flow chart illustrating a process of obtaining license information for playing high definition content stored in a storage device, according to an embodiment to which the present invention is applied.

The user may purchase secure HD content, and in order to play the purchased HD content, the user needs to be provided with license information from the license server 800.

When the user purchases HD content, the user may be provided with transaction information from a seller, and the provided transaction information may be stored in the storage device 300. Here, the storage device 300 may include a file system 310 and a secure controller 320.

The file system 310 may store the encrypted HD content and license information, encryption information, and a certificate revision list (CRL) in order to play the encrypted HD content.

The secure controller 320 may be connected to the license server 800 through the playback device 200, and may perform a mutual response process (handshake process) with the license server with respect to license information, encryption information, and a certificate list required for playing content.

Referring to FIG. 26, the secure controller 320 may access the license server 800 through the playback device 200 to request license information (S2610). Upon receiving the license information request, the license server 800 establishes a secure session with the secure controller 320 (S2620).

When the secure session is established, license information may be transmitted through the secure session. For example, the license server 800 may transmit license key information to the secure controller 320 (S2630) and transmit license file information to the file system 310 (S2640).

Here, the license key information or the license file information may include at least one of video key information, audio key information, specific key information, and meta data key information. Here, the specific key information may be used to decrypt a specific portion of a sample.

In another embodiment to which the present invention is applied, the license server may generate a license file. The license server may receive a shadow key of the playback device from the playback device. The license server may encrypt video key information K1_video and audio key information (K1_audio) by using the shadow key. In encrypting, common key information common to every playback device may be used.

The license server may generate a shadow key by using license key information stored in the storage device. The license server may re-encrypt the video key information K1_video and the audio key information K1_audio by using the shadow key to generate re-encrypted video key information K2_video and audio key information K2_audio. The license server may re-encrypt the video key information K2_video and the audio key information K2_audio to generate re-encrypted video key information K3_video and audio key information K3_audio. Through the aforementioned process, the license server may generate a license file.

INDUSTRIAL APPLICABILITY

While exemplary embodiments have been shown and described above, it will be apparent to those skilled in the art that modifications and variations could be made without departing from the scope of the present invention as defined by the appended claims.

The invention claimed is:

1. A method of playing a content stored in a storage device, the method comprising:
    requesting a conversion of the content from a content service server;
    receiving content key information and additional information for the conversion of the content from the content service server; and
    performing the conversion of the content based on the content key information and the additional information.

2. The method of claim 1,
    wherein the content key information is received when it is confirmed by the content service server that at least one of a content player and the storage device supports a digital bridge function, and
    wherein the digital bridge function represents that the content is converted to a different type of content.

3. The method of claim 1,
    wherein the content key information indicates certificate information which is required for using the content stored in the storage device.

4. The method of claim 1,
    wherein the additional information includes at least one of a subtitle content, an audio content and a metadata.

5. The method of claim 4,
    wherein the additional information is multiplexed to a single consecutive bitstream.

6. The method of claim 1,
    wherein the content indicates BD (Blu-ray Disc) content, and the BD content is converted to Secure Content Storage Association (SCSA) content.

7. The method of claim 6, further comprising:
checking whether it is possible to play the SCSA content;
receiving license information from a license server when it is not possible to play the SCSA content, as a result of the checking; and
playing the SCSA content based on the license information.

8. The method of claim 7,
wherein the license information includes at least one of license file information and license key information.

9. An apparatus for playing content stored in a storage device, the apparatus comprising:
a controller configured to:
  request a conversion of the content to a content service server, and
  receive content key information and additional information for the conversion of the content from the content service server; and
a repackaging engine configured to perform the conversion of the content based on the content key information and the additional information.

10. The apparatus of claim 9,
wherein the content key information is received when it is confirmed by the content service server that at least one of a content player and the storage device supports a digital bridge function, and
wherein the digital bridge function represents that the content is converted to a different type of content.

11. The apparatus of claim 9,
wherein the content key information indicates certificate information which is required for using the content stored in the storage device.

12. The apparatus of claim 9,
wherein the additional information includes at least one of a subtitle content, an audio content and a metadata.

13. The apparatus of claim 12, further comprising:
an export buffer configured to multiplex the additional information as a single consecutive bitstream.

14. The apparatus of claim 9,
wherein the content indicates Blu-ray Disc (BD) content, and the BD content is converted to Secure Content Storage Association (SCSA) content.

15. The apparatus of claim 14,
wherein the controller is further configured to check whether it is possible to play the SCSA content, and receive license information from a license server when it is not possible to play the SCSA content as a result of the checking,
wherein the apparatus further comprises a decoder configured to play the SCSA content based on the license information.

16. The apparatus of claim 15,
wherein the license information includes at least one of license file information and license key information.

* * * * *